United States Patent

Kim et al.

[11] Patent Number: 5,967,936
[45] Date of Patent: Oct. 19, 1999

[54] AUTOMATIC VARIABLE TRANSMISSION AND HYDRAULIC CONTROL SYSTEM THEREOF

[75] Inventors: Jong-Pil Kim; Yeong-Soo Cho, both of Seoul, Rep. of Korea

[73] Assignee: KIA Motors Corporation, Seoul, Rep. of Korea

[21] Appl. No.: 08/995,523

[22] Filed: Dec. 22, 1997

[30] Foreign Application Priority Data

Feb. 6, 1997 [KR] Rep. of Korea .................. 97-5944
Feb. 26, 1997 [KR] Rep. of Korea .................. 97-5943

[51] Int. Cl.$^6$ ........................................... F16H 3/44
[52] U.S. Cl. ................. 475/287; 475/269; 475/286; 475/282
[58] Field of Search ................... 475/269, 271, 475/282, 283, 286, 287, 311, 317, 318, 319

[56] References Cited

FOREIGN PATENT DOCUMENTS

| | | |
|---|---|---|
| 59-34049 | 2/1984 | Japan . |
| 62-35144 | 2/1987 | Japan . |
| 62-233543 | 10/1987 | Japan . |

*Primary Examiner*—Dirk Wright
*Assistant Examiner*—Peter T. Kwon
*Attorney, Agent, or Firm*—Fleshner & Kim

[57] ABSTRACT

An automatic variable transmnission, and a hydraulic pressure control system for the same, have a structure which can be installed in both rear and front wheel drive vehicles. The transmission includes: a torque converter which is connected to an output shaft of an engine and which converts and transfers torque from the engine; an input shaft connected to the output shaft of the torque converter; first and second planetary gearsets which are located between the input shaft and an output shaft; a first clutch which selectively locks a sun gear of the second planetary gearset to the input shaft; a second clutch which selectively locks the input shaft to the planetary pinion gear carrier of the first planetary gearset; a third clutch for selectively connecting the input shaft with a sun gear of the first planetary gearset; a first brake for selectively restricting the rotation of the sun gear of the first planetary gearset; a second brake for restricting rotation of both the ring gear of the second planetary gearset and the planetary pinion gear carrier of the first planetary gearset; and a one-way clutch to limit the rotational direction of the ring gear of the second planetary gearset and the planetary pinion gear carrier of the first planetary gearset.

16 Claims, 23 Drawing Sheets

AUTOMATIC VARIABLE TRANSMISSION AND HYDRAULIC CONTROL SYSTEM THEREOF

BACKGROUND OF THE INVENTION

1. Field of the Invention

The present invention relates to an automatic variable transmission, and more particularly to an automatic variable transmission and hydraulic control system thereof having a structure which can be installed in either a front or rear wheel drive vehicle.

2. Background of the Related Art

Typically, a vehicle having a front engine and rear wheel drive has a transmission mounted at the front of the vehicle, and a driveline which transfers power to the rear wheels. Accordingly, the vehicle has a power transfer system wherein the power of the engine is transferred to the rear axle. This power transfer system is different from a power transfer system of an automatic variable transmission of a front engine, front wheel drive vehicle.

The power transfer system used with an automatic variable transmission in a front engine, front wheel drive vehicle is generally utilized for small cars. Typically such a system is arranged laterally with the engine (arranged along the width direction of the vehicle). This is commonly referred to as a transverse mounted engine and transmission. When power from an output shaft of the transmission is transferred to the drive wheels, the power must pass through a differential gear unit. Typically, the differential unit is not centered between the drive wheels. As a result, the length of connecting shafts passing from the differential gear unit to the front drive wheels is unequal. For this reason, ordinarily a structure is used in which the power transmitted from the main output shaft of the transmission is returned by a counter-shaft that is parallel with the main shaft. The power passes from the counter-shaft to a final driving pinion gear provided at an end portion of the counter-shaft and then to a final driving gear engaged with the final driving pinion so as to be transferred to a differential gear unit. Alternatively, power from the engine is first transferred to a rear side of the transmission device. The power is then transferred through an intermediate shaft gear to the differential gear unit. Since the automatic variable transmission of a vehicle having a transverse mounted structure is limited by the lateral size of the automobile, a lateral miniaturization is desired.

In order to solve the above problem, Japanese Patent Publication No. Sho-59-34049 discloses an automatic variable transmission with four forward speeds having only two planetary gears instead of the conventional three planetary gears.

In the transmission disclosed in Japanese Patent Publication No. Sho-59-34049, a one way clutch is utilized only for first gear. Therefore, a shifting into 4th gear or shifting out of 4th gear requires operation of multiple separate frictional elements. When the application/release of the frictional elements is not properly timed, there is an abrupt rise of the engine speed, and an interlock of the transmission mechanism, whereby a large transmission shock is generated. Therefore, it is necessary to precisely control the timing of the application of hydraulic pressure of the control system and speed variation of both frictional elements so that such a problem does not occur. Such a control system becomes complicated.

In order to solve such a problem, Japanese Patent Publication No. Sho-60-117866 of Nissan Jidosha Kabushiki Kaisha offers a gear transmission mechanism with two one-way clutches. Such a transmission includes numerous coaxially provided sets of planetary gears.

In the transmission disclosed in Japanese Patent Publication No. Sho-60-117866, application of a first hydraulic clutch causes a reactionary force of normal rotation to be received by the transmission casing through a first one-way clutch, a first hydraulic clutch, and a second one-way clutch. In this state, a power transfer path of the planetary gear is set to a low speed step selection state. By selectively coupling the first hydraulic clutch and a second hydraulic clutch that is coaxially provided in parallel to a planetary gear, the power transfer path of the planetary gearset is set to a medium speed step selection state through an opening of the above-described second one-way clutch. The power transfer path of the planetary gear can be set to a high speed step selection state through an opening of the first and second one-way clutches, and by a coupling of a hydraulic brake and the second clutch. However, the addition of the second one-way clutch makes the automatic variable transmission larger in an axial direction, which makes it more difficult to mount the transmission on a front engine, front wheel drive vehicle, regardless of whether the transmission has only two planetary gears.

In order to solve the above-described problem, the first embodiment of Japanese Patent Publication Sho-62-233543 discloses a structure in which a one-way clutch is arranged around a planetary gear near a separate hydraulic clutch. The automatic variable transmission is of a type where a one-way clutch is added. The above-described hydraulic clutch is arranged around the one way clutch.

In such a transmission, when a first forward speed is selected a first hydraulic clutch is coupled such that a normal reactionary force generated in accordance with power transfer of the automatic variable transmission reaches the transmission casing through a first one-way clutch, the first hydraulic clutch and a second one-way clutch. In this state, when a first hydraulic brake or a second hydraulic clutch is selectively coupled, and the second one-way clutch is opened, a medium speed step is selected. In addition, when the first hydraulic clutch is coupled, a predetermined hydraulic brake and a second hydraulic clutch are coupled, and the first and second one-way clutches are opened, a high speed state is selected.

A conventional automatic variable transmission as described above will be more concretely explained with reference to FIG. 1.

As shown in FIG. 1, a front planetary gearset 53 and a rear planetary gearset 54 are coaxially provided between a coaxially arranged input shaft 51 and an output shaft 52. A front sun gear 53S is selectively connected to the casing by a band brake B/B, such as the above described hydraulic brake. The front sun gear 53S is also connected to the input shaft 51 by a reverse clutch R/C.

A front pinion gear carrier 53C supporting a front pinion gear 53P is coupled to the input shaft 51 by a high clutch H/C, such as the above-described second hydraulic clutch. The front pinion gear carrier 53C is selectively coupled to the casing by a low reverse brake LR/B, and is selectively coupled to a rear ring gear 54R by an over running clutch OR/C and a forward one-way clutch. The overrunning clutch OR/C and the forward one-way clutch FO/C are arranged in series.

The front pinion gear carrier 53C may also be selectively coupled to the rear ring gear 54R by a forward clutch F/C, which is arranged in parallel to the over running clutch OR/C and the forward one way clutch FO/C. In addition, the forward one way clutch FO/C is arranged so that the rear ring gear 54R may rotate in the same direction as the input shaft 51 and the front pinion gear carrier 53C. The forward one way clutch FO/C is made such that when the rear ring gear 54R is rotated at a high speed by the front pinion gear carrier 53C in same direction, the forward one way clutch FO/C is opened so that relative rotation of both is allowed.

Further, the rear pinion gear carrier 54C supporting the rear pinion gear 54P is coupled to the front ring gear 53R and the output shaft 52. The rear sun gear 54S is coupled to the input shaft 51.

Since, however, the conventional automatic variable transmission described as above uses a band brake, a servo hydraulic mechanism is required to operate the band brake. This can be a problem because exact time control is required for application of a hydraulic pressure to smoothly operate the band brake. Moreover, since the hydraulic pressure servo mechanism is added to the automatic variable transmission, a weight and manufacturing cost of the automatic variable transmission is increased. The extra weight decreases the fuel efficiency of a vehicle utilizing the transmission.

The structure of an automatic variable transmission that attempts to solve the above-described problem is shown in FIG. 2 and FIG. 3. FIG. 2 is a cross sectional view showing a structure of the automatic variable transmission, and FIG. 3 is a schematic view showing a power transferring path of the automatic variable transmission shown in FIG. 2.

The automatic variable transmission has four forward speeds and one reverse speed, and includes a fluid torque converter 62 which is connected with an output shaft of an engine. The transmission also includes a first planetary gear unit 71 and second planetary gear unit 72, which are provided between the fluid torque converter 62 and an output shaft. The transmission further includes three clutches C11, C12, C13 for selectively coupling power from the above-described fluid torque converter 62 to elements of the planetary gearsets. The transmission also includes three brakes B11, B19, B13 for selectively coupling elements of above-described planetary gearsets to the transmission casing. The transmission further includes a first one way clutch F11 for restricting a rotational direction of the first sun gear 71S of the first planetary gear unit 71; and a second one way clutch F12 for restricting a rotational direction of the second ring gear 72R of the second planetary gear unit 72.

The automatic variable transmission operates in a second forward speed when a second brake B12 or a first brake B11 are applied while the first clutch C11 is engaged. Here, the second brake B12 is for an engine brake, and is activated by sliding along splines formed on an exterior surface of a locking force transferring member 65 and an interior surface of a transmission casing 66 under the urging of a piston 64. As a result, a rotation of the sun gear 71S of the first planetary gear unit 71 is locked by a rotational motion of a first hub assembly 67.

Furthermore, the sun gear 72S of the second planetary, gear unit 72 receives power from the second hub assembly 68 when the first clutch C11 is engaged. This causes the planetary pinion gear 72P, which is engaged with the sun gear 72S, to rotate with the sun gear 72S. The planetary pinion gear 72P, which is engaged with the ring gear 72R, tends to rotate the ring gear 72R in the same direction as the planetary pinion gear 72P. However, the second one way clutch F12 restricts the rotation of the ring gear 72R, and the ring gear 72R rotates in the same rotational direction as the planetary pinion gear carrier 71C of the first planetary gear unit 71.

The ring gear 71R of the first planetary gear unit 71 is connected with and rotates in the same direction as planetary pinion gear carrier 72C. Since the sun gear 71S of the first planetary unit 71 is locked to the transmission casing by an operation of the second brake B12 or the first one way clutch F11, the planetary pinion gear 71P of the first planetary gear unit 71, which is engaged with the ring gear 71R, rotates and orbits in the same rotational direction as the planetary pinion gear carrier 72C.

The operating elements of the planetary gear units 71 and 72 are controlled by operation of the frictional operating elements noted above, e.g., the first, second and third clutches C11, C12, C13, the first, second and third brake B11, B12, B13 and the first and second one-way clutches F11, F12, such that power from the fluid torque converter is transmitted to create four forward speeds and one reverse speed.

In the conventional automatic variable transmission as described above, however, three brakes are used in order to obtain the four forward speeds and the one reverse speed. A piston is required to operate each brake, and a separate one way clutch is used for obtaining two of the forward speeds. This makes the structure complicated, and increases manufacturing costs.

Further, because the structure of the transmission is complicated, the hydraulic control system for operating each frictional operating element requires expensive solenoid valves or complicated electronic control logic. This further increases the complexity of the system and the manufacturing costs.

SUMMARY OF THE INVENTION

It is a first object of the present invention to provide an automatic variable transmission having a structure which minimizes the required number of one way clutches so that the structure is simplified. A second object of the present invention is to provide an automatic variable transmission having a more compact structure and that is simultaneously capable of being manufacturing at a low cost. A third object of the present invention is to provide a hydraulic fluid control system which is structurally simple and inexpensive to manufacture.

An automatic variable transmission in accordance with the present invention has four forward speeds and one reverse speed and includes a fluid torque converter which is connected with an output shaft of an engine and which converts and transfers a torque of the engine to a transmission input shaft. The transmission also includes first and second planetary gear units which are provided between the input shaft and an output shaft. The transmission also has a first clutch for selectively connecting a sun gear of the second planetary gear unit to the input shaft, a second clutch which is arranged in parallel with the first clutch and which selectively connects the input shaft with the planetary pinion gear carrier of the first planetary gear unit, and a third clutch for selectively connecting the input shaft with the sun gear of the first planetary gear unit. The transmission further includes a first brake for restricting the rotation of the sun gear of the first planetary gear unit, a second brake for restricting rotation of the ring gear of the second planetary gear unit and the planetary pinion gear carrier of the first planetary gear unit. The transmission also includes a one way clutch for restricting rotation of the ring gear of the second planetary gear unit and the pinion gear carrier of the first planetary gear unit.

The third object of the present invention is accomplished by providing a hydraulic control system that includes a line pressure adjusting valve for adjusting a pressure of hydraulic fluid from a hydraulic fluid pump that is supplied to a manual valve. The hydraulic control system also includes a relief valve for adjusting the pressure of hydraulic fluid passing through the line pressure adjusting valve. A pilot valve controls a pressure of hydraulic fluid supplied by the line pressure adjusting valve to a pilot pressure. A lock-up control valve controls a pressure of hydraulic fluid supplied from the relief valve and conveys the pressure to a lock-up clutch. Four normally open-type solenoid valves are provided, in parallel, and are connected to hydraulic pressure through the pilot valve. Numerous operating element control valves operate so as to guide the hydraulic pressure to each operating element of the transmission under the control of the solenoid valves. The control system also includes a safety valve to prevent the hydraulic pressure from being supplied to the wrong operating elements. A number of accumulators are also provided in the paths between the operating element control valves and each operating element so as to prevent an occurrence of an operating shock at the respective operating element upon shifting between gears. Also, orifice check valves are provided at inlets of the accumulators to control the discharge flow from the accumulators upon release of hydraulic pressure.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

A more complete appreciation of this invention, and many of the attendant advantages thereof, will be readily apparent with reference to the following detailed description when considered in conjunction with the accompanying drawings in which like reference symbols indicate the same or similar components, and wherein.

DETAILED DESCRIPTION OF PREFERRED EMBODIMENTS

Figure 1:
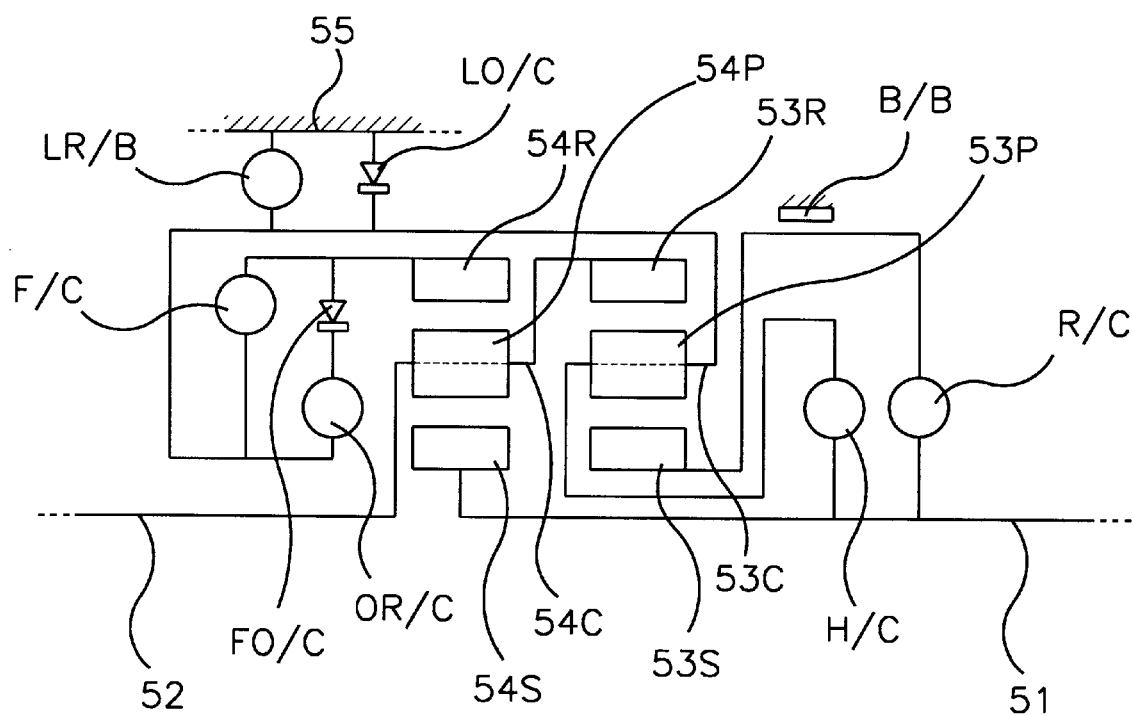
FIG. 1 is a schematic diagram showing a structure for a conventional automatic variable transmission.
Figure 2:
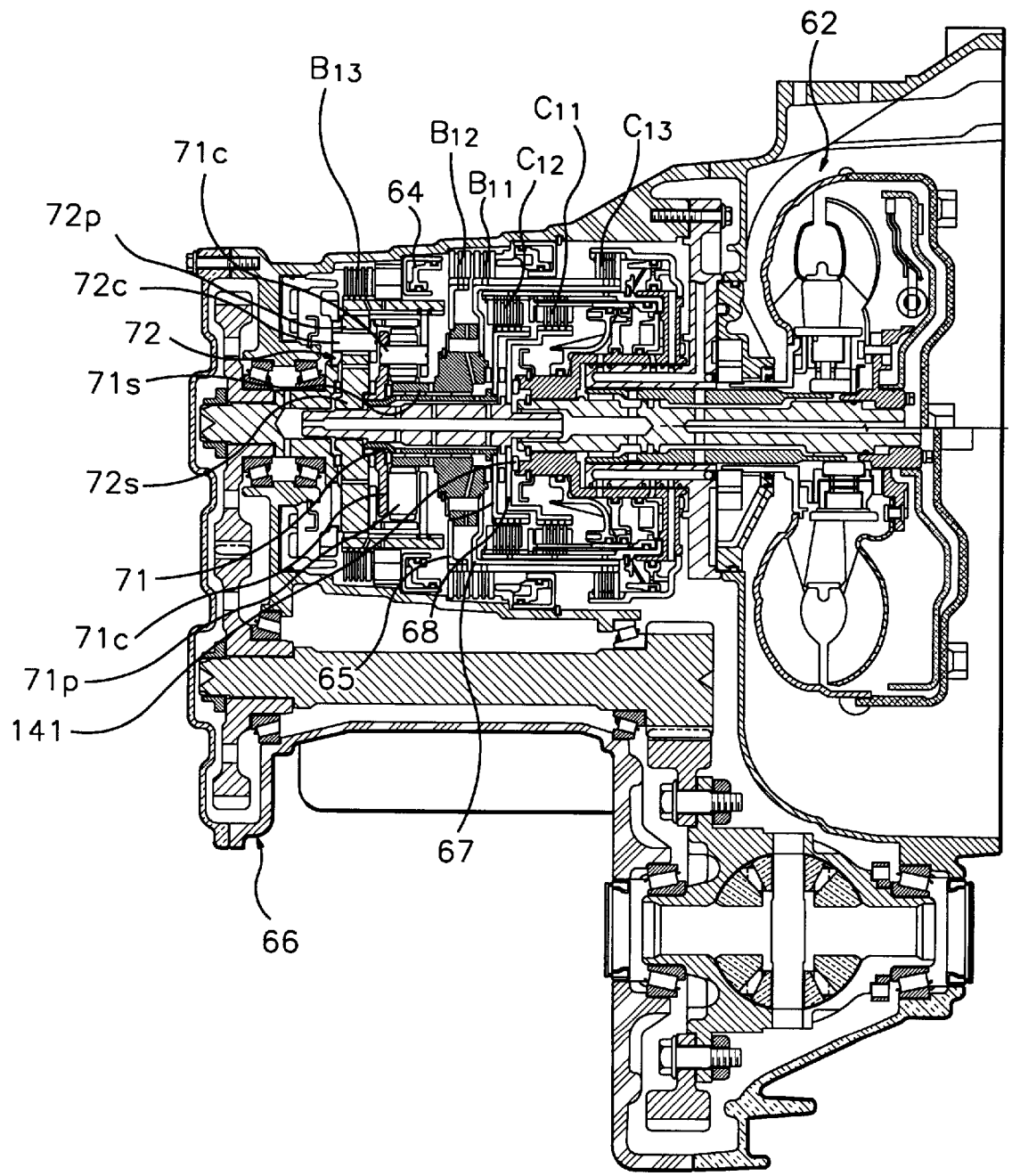
FIG. 2 is a cross sectional view showing another example of a conventional automatic variable transmission.
Figure 3:
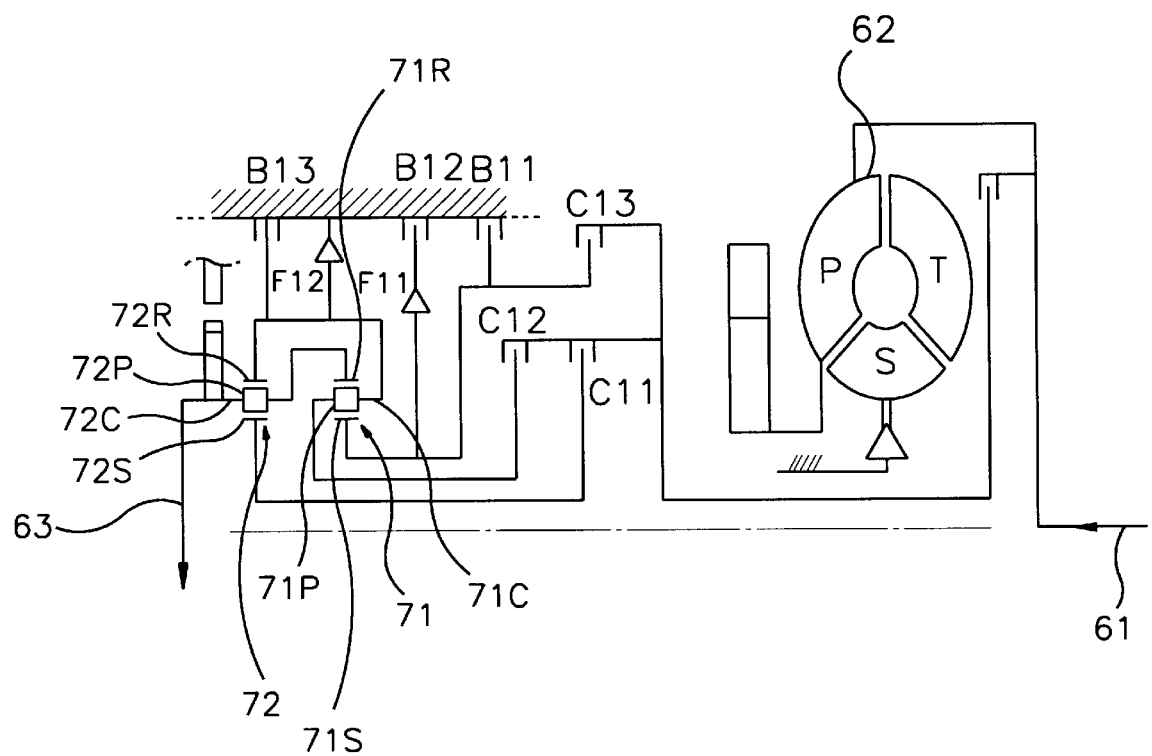
FIG. 3 is a schematic diagram showing a power transfer path of the automatic variable transmission shown in FIG. 2.
Figure 4:
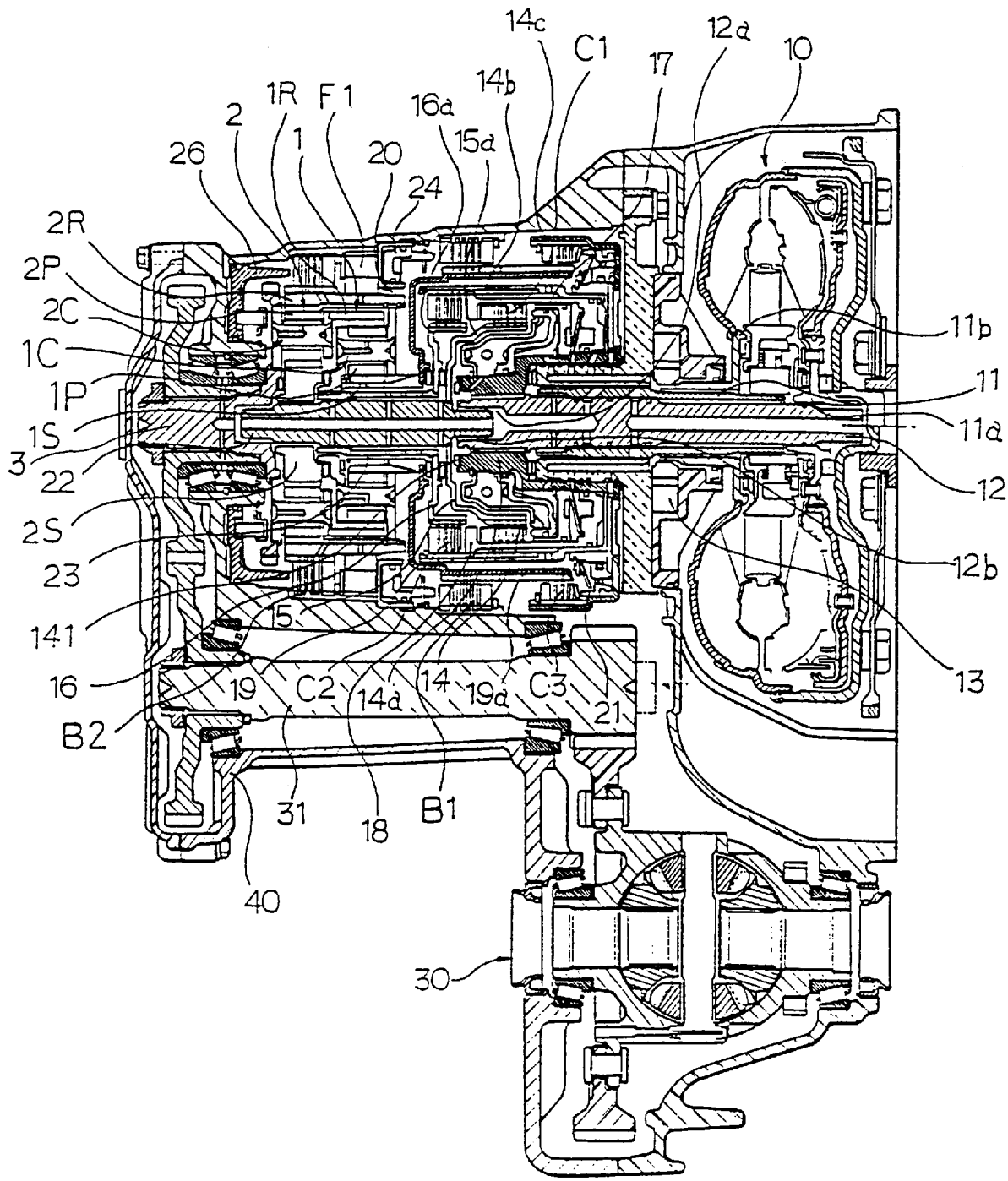
FIG. 4 is a cross sectional view showing a structure of an automatic variable transmission embodying the present invention.
Figure 5:
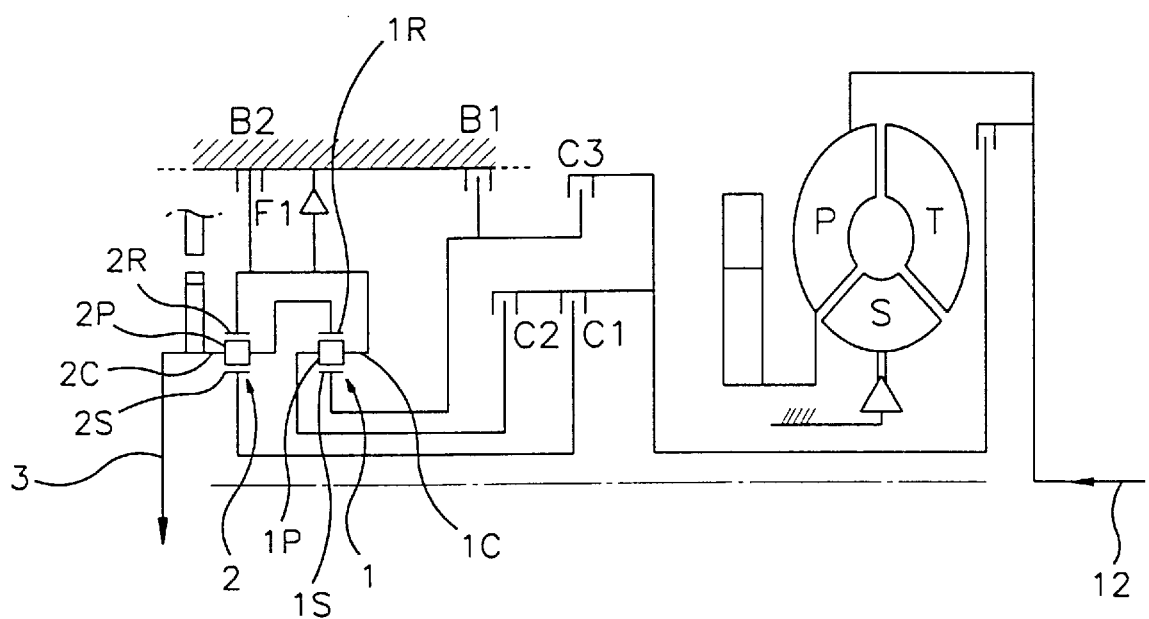
FIG. 5 is a schematic diagram showing a power transfer path of the automatic variable transmission shown in FIG. 4.

FIG. 4 is a cross sectional view showing a structure of an automatic variable transmission embodying the present invention. FIG. 5 is a schematic diagram showing the power transfer path of the automatic variable transmission shown in FIG. 4. The transmission includes a fluid torque converter 10, a transmission gear assembly 20, a differential gear device 30, and a transmission casing 40.

The fluid torque converter 10 is connected to an output shaft of an engine and converts and transfers torque from the engine to the other components of the transmission. A transmission gear assembly 20 transfers engine torque from the fluid torque converter 10 to the differential gear device 30. Torque from the transmission gear assembly 20 is transferred to right and left driving wheels of a vehicle by the differential gear device 30.

The fluid torque converter 10 includes a turbine runner 11a and a pump impeller 11b. Torque from the fluid torque converter 10 is transferred to the transmission gear unit 20 through an input shaft 12 engaged with the turbine runner 11a.

A pump 13 generates hydraulic pressure for operating the coupling elements and braking elements of the transmission. The pump 13 is located at an external surface of the input shaft 12. This pump 13 is made so as to be driven by rotation of the pump impeller 11b, which rotates with the engine output shaft. The pump 13 supplies pressurized hydraulic fluid to the coupling elements and the brake elements of the transmission, via a plurality of hydraulic lines, to control the transmission.

The input shaft 12 is coupled with the turbine runner 11a of the fluid torque converter 10 at one end via a spline. A clutch drum assembly 14 is coupled to the other end of the input shaft 12 via another spline. The clutch drum assembly 14 includes a central clutch drum 14a formed with an internal gear spline which is coupled with the input shaft 12. The clutch drum assembly 14 also includes first and second clutch drums 14b, 14c formed with splines at internal surfaces, respectively. The first clutch drum 14b is located between the central clutch drum 14a and the second clutch drum 14c. The second clutch drum 14c is a cylindrical body which is connected in parallel with the first clutch drum 14b and which has a shorter length than the first clutch drum 14b. In addition, the first clutch drum 14b is formed with splines on its internal surface. Confronting splines are also formed on hubs 15a and 16a of first and second hub assemblies 15 and 16.

The first and second clutches C1 and C2 are designed to be able to slide along the splines by actuation of first and second pistons 17 and 18. These splines are formed at the internal surface of the first clutch drum 14b and the external surfaces of the hubs 15a and 16a of first and second hub assemblies 15, 16. The first and second clutches C1, C2 are multiple disc clutches. Torque from the input shaft 12 is selectively transferred to the first and second hub assemblies 15 and 16 through the clutch drum assembly 14 by selectively engaging the first and second clutches C1 and C2.

A third clutch C3 is designed to be able to slide along splines formed on an external surface of hub 19a of a third hub assembly 19, which surrounds an external surface of the first clutch drum 14b. The third clutch C3 transfers torque from the clutch drum assembly 14 to the third hub assembly 19 when a third piston 21 is actuated by hydraulic to pressure.

The first hub assembly 15 can be locked to or released from the clutch drum assembly 14 through selective engagement of the first clutch C1. The first hub assembly includes a hub 15a attached to a first intermediate shaft 22 which is fixed to the center of hub 15a. The first intermediate shaft 22 is positioned along the same axis of rotation as the input shaft 12. A first end of the first intermediate shaft 22 is positioned near the end of the input shaft 12. A second end of the intermediate shaft 22 is fixed to the sun gear 2S of the second planetary gearset 2.

A first thrust needle bearing 141 is positioned between the clutch drum assembly 14 and the first hub assembly 15, whereby the clutch drum assembly 14 and the first hub assembly 15 can be easily rotated with respect to one another. The first end of the first intermediate shaft 22 passes through a disc portion of the first hub assembly 15, and is positioned in an open portion 12a formed in the end of input shaft 12. A bushing 12b is positioned between the open portion 12a of the input shaft 12 and the first end of the first intermediate shaft 22, whereby the two members are supported by the bushing 12b so as to be able to smoothly rotate with respect to one another.

The second hub assembly 16 can be selectively locked to or released from the clutch drum assembly 14 through engagement of the second clutch C2. A hub 16a of the second hub assembly 16 is integrally formed with a second intermediate shaft 23, which surrounds the first intermediate shaft 22. A spline formed at an end portion of the second intermediate shaft 23 is coupled with the planetary pinion gear carrier 1C of the first planetary gearset 1, such that the planetary pinion gear carrier 1C rotates with the second intermediate shaft 23.

A third hub assembly 19 can be selectively locked to or released from the clutch drum assembly 14 through engagement of the third clutch C3. The third hub assembly 19 includes a hub 19a with a spline on its external surface and a main body portion attached to the sun gear 1S of the first planetary gearset 1. The third hub assembly 19 is integrally formed with sun gear 1S of the first planetary gearset 1 so as to transfer the power of the input shaft 12 to the sun gear 1S of the first planetary gearset 1.

The first brake B1 is attached to the transmission casing 40 via a spline on the casing. A piston 24 is used to apply the first brake B1, which locks the sun gear 1S of the first planetary gearset 1 to the casing 40 so as to isolate the sun gear 1S.

The first and second planetary gearsets 1 and 2 include planetary pinion gears 1P and 2P engaged with sun gears 1S and 2S and ring gears 1R and 2R, respectively. Planetary pinion gear carriers 1C and 2C support the planetary pinion gears 1P and 2P, respectively. The first and second planetary gearsets 1 and 2 of the transmission are selectively connected with the input shaft 12 through the hub assemblies 15, 16, 19 and the clutch drum assembly 14. The sun gear 1S of the first planetary gearset 1 is integrally formed with third hub assembly 19 as described above. Power from the input shaft 12 is transferred to the sun gear 1S by engagement of the third clutch C3. Moreover, as will be understood from FIG. 5, the sun gear 1S of the first planetary gearset 1 may be locked to the transmission casing 40 by the first brake B1.

The planetary pinion gear carrier 1C supporting the planetary pinion gear 1P is engaged with the second intermediate shaft 23 attached to the second hub assembly 16. The planetary pinion gear carrier 1C is also connected to the ring gear 2R of the second planetary gearset 2. The ring gear 2R of second planetary gearset 2 and the planetary pinion gear carrier 1C of the first planetary gearset 1 can be fixed relative to the transmission casing 40 by the second brake B2, as will be understood from FIG. 5.

The one way clutch F1 prevents the ring gear 2R of the second planetary gearset 2 and the planetary pinion gear carrier 1C of the first planetary gearset 1 from being rotated in a direction opposite the direction of rotation of the engine regardless of the application of the second brake B2. The second brake B2 is applied by actuation of piston 26. The second brake B2 is mounted between a spline formed on the external surface of the ring gear 2R of the second planetary gearset 1 and a spline formed on an internal surface of the transmission casing 40.

The sun gear 2S of the second planetary gearset 2 is coupled to the first intermediate shaft and to the first hub assembly 15 via a spline. The planetary pinion gear carrier 2C is connected to the ring gear 1R of the first planetary gearset 1. The ring gear 2R of second planetary gearset 2 is connected with the planetary pinion gear carrier 1C supporting the planetary pinion gear 1P of first planetary gearset 1, as described above.

As will be understood from the above description, the output shaft 3 of an automatic variable transmission embodying the present invention receives torque from the input shaft 12 through the planetary pinion gear carrier 2C of second planetary gearset 2.

The operating states of the elements of an automatic variable transmission embodying the invention, as shown in FIG. 4, will now be explained for each of the different gears with reference to Table 1.

TABLE 1

| Transmission Setting | Gear | Engine Braking | C1 | C2 | C3 | B1 | B2 | F1 |
|---|---|---|---|---|---|---|---|---|
| P | | | | | | | | |
| R | Reverse | O | | | O | | O | |
| N | | | | | | | | |
| D | 1st | | O | | | | | O |
| | 2nd | | O | O | | | O | |
| | 3rd | | O | O | O | | | |
| | 4th | | O | | O | | O | |
| 3 | 1st | | O | | | | | O |
| | 2nd | | O | O | | | O | |
| | 3rd | | O | O | O | | O | |
| 2 | 1st | | O | | | | | O |
| | 2nd | | O | O | | O | | |
| 1 | 1st | | O | O | | | O | O |

In Table 1, the use of the symbol O indicates that an element is engaged or applied. If no symbol appears, the element is not engaged/applied.

Because the operating states of the elements are the same for a particular gear, regardless of the range selected by a gearshift lever, a description of the operating states for each gear for every selected range will be omitted. Instead, the operating states for each of the elements in each of the gears will be described only once for each gear.

Neutral (N) and Park (P)

The N and P transmission settings are cases where the speed of the automobile is zero and there is no speed change of the automobile. Accordingly, no elements are shown to be operating in Table 1. Each planetary gearset of the automatic variable transmission is freely rotated or stopped and no torque transfer to the output shaft from engine is made.

Reverse (R) Range

The R range is a range wherein an automobile is moving backwards. As shown in Table 1, when the transmission is set to reverse, the third clutch C3 is engaged and the second brake B2 is applied.

As shown in FIG. 4, the third clutch C3 slides along splines formed on the third hub assembly 19 and the second clutch drum 14c of clutch drum assembly 14. The third clutch is engaged by actuation of the third piston 21. This causes torque from the input shaft 12 to be transferred to the third hub assembly 19 through the clutch drum assembly 14. Since the third hub assembly 19 is integrally formed with the sun gear 1S of the first planetary gearset 1, as described above, the sun gear 1S of first planetary gearset 1 rotates with the input shaft 12. The second brake B2 slides along splines formed on the internal surface of the transmission casing 40 and the external surface of the ring gear 2R of second planetary gearset 2. The second brake is applied by actuation of piston 26, which holds the ring gear 2R of the second planetary gearset and the planetary pinion gear carrier 1C of first planetary gearset fixed relative to the casing 40.

Figure 6A:
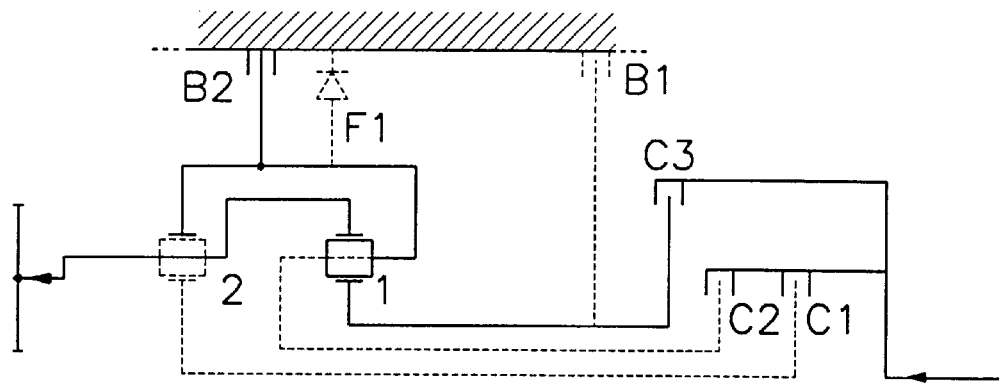
FIG. 6A is a schematic diagram showing the power transfer path of an automatic variable transmission embodying the present invention when the transmission is operating in a reverse gear.
Figure 6B:
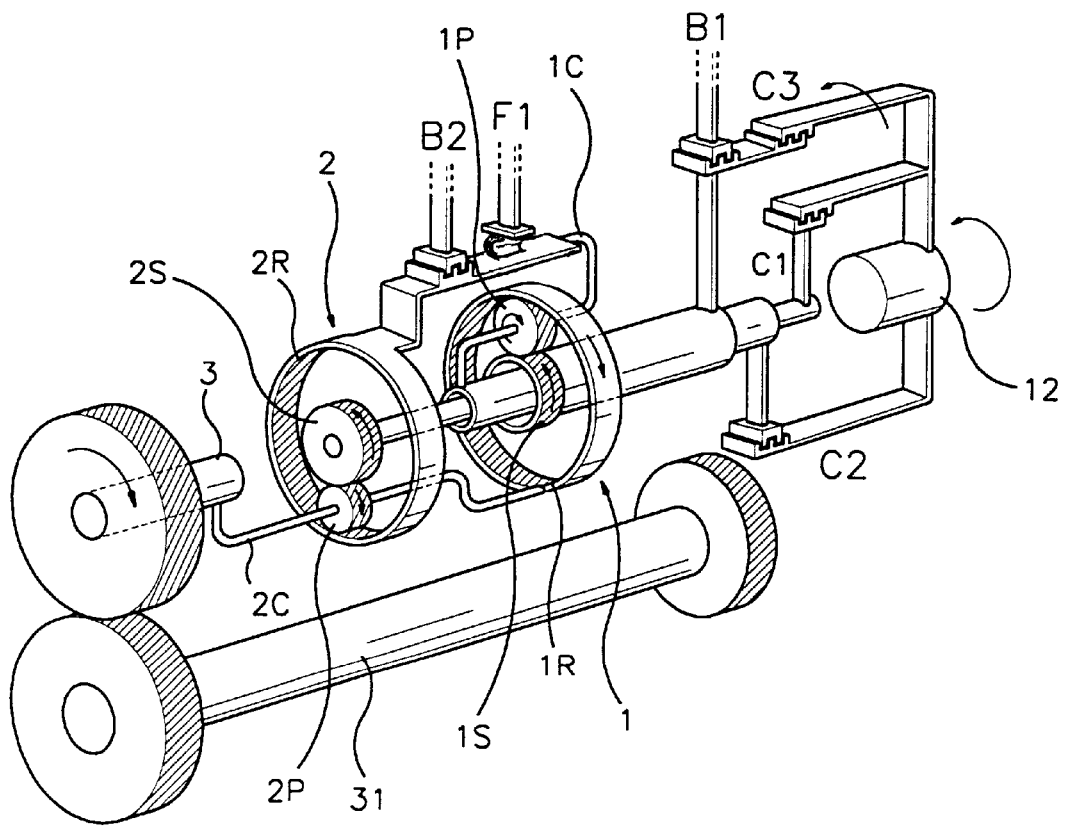
FIG. 6B is an exploded perspective view showing rotating states of planetary gearsets of the transmission according to the power transfer path of FIG. 6A.

The movement of the various gears will now be explained with reference to FIGS. 6A and 6B. The sun gear 1S of first planetary gearset 1 rotates in the same direction as the input shaft 12. The planetary pinion gear 1P of the first planetary gearset 1 is engaged with the sun gear 1S of the first planetary gearset 1, which causes it to rotate in a direction opposite to the sun gear 1S. The planetary pinion gear carrier 1C of the first planetary gearset 1 is held by the second brake B2, as shown in FIG. 6A. Thus, the planetary pinion gear 1P is prevented from revolving around the sun gear 1S. The spinning of the planetary pinion gear 1P transfers torque from the sun gear 1S to the ring gear 1R, and the ring gear 1R also rotates in a direction opposite to the sun gear 1S. Since the ring gear 1R of the first planetary gearset 1 is connected with the planetary pinion gear carrier 2C of the second planetary gearset 2, as described above, the planetary pinion gear carrier 2C of second planetary gearset 2 rotates in the same direction as the ring gear 1R of first planetary gearset 1. Thus, the output shaft 3 of the automatic variable transmission rotates in a direction opposite to the input shaft 12.

Because of the gear configuration in the R range, which torque is applied to the output shaft 3 due to the weight of the automobile moving down a hill, engine braking force is provided by an operation of the second brake B2.

First Gear

First gear is used when the vehicle is operating at low speed, such as when the vehicle begins moving from a stop or when the vehicle is under a heavy load while going up a hill. The operation of the transmission in the first gear is identical, regardless of whether the transmission is set to D, 3, 2, or 1, except when engine braking could occur. Engine braking may occur when the vehicle is coasting downhill and the weight of the vehicle could cause acceleration of the vehicle. Engine braking can limit acceleration or even decelerate the vehicle. In transmission setting 1, engine braking is possible due to the application of the second brake B2, which holds the ring gear 2R of the second planetary gearset 2 fixed relative to the transmission casing 40. In transmission settings D, 3, and 2, the second brake B2 is never applied. Instead, the one-way clutch F1 is used to prevent rotation of the ring gear 2R in a direction opposite that of the output shaft 3. However the one-way clutch F1 allows rotation of the ring gear 2R in the same direction as the output shaft 3, thus preventing the application of engine braking.

Figure 7A:
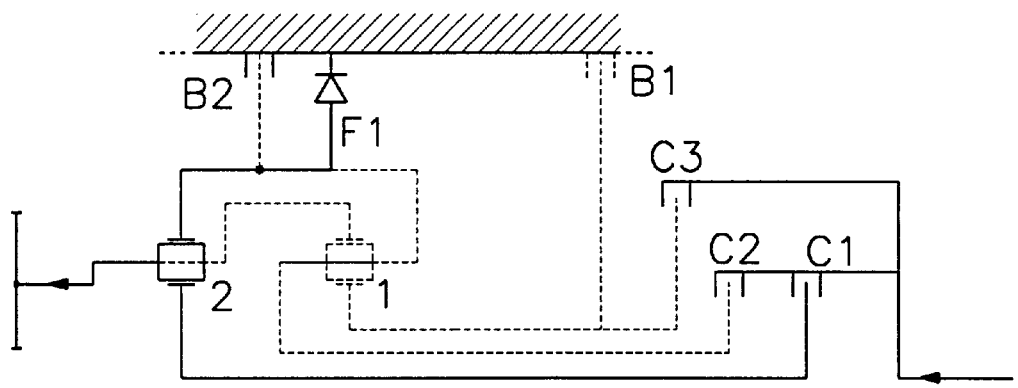
FIG. 7A is a schematic diagram showing the power transfer path of an automatic variable transmission embodying the present invention when the transmission is operating in a first gear.
Figure 7B:
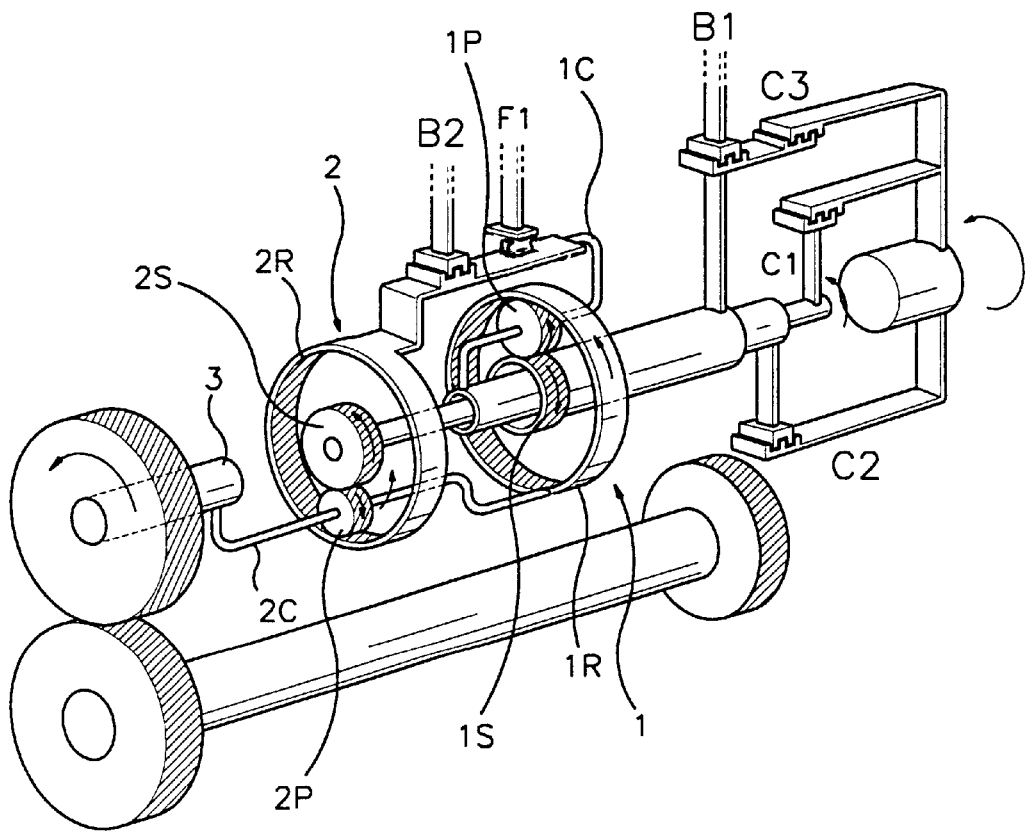
FIG. 7B is an exploded perspective view showing rotating states of planetary gearsets of the transmission according to the power transfer path of FIG. 7A.

An explanation of the operating states of the various transmission elements while the transmission operates in first gear will now be explained with reference to FIGS. 7A and 7B.

When the transmission is operating in first gear, the first clutch C1 and the one-way clutch F1 are engaged. The input shaft 12, which is fixed to the clutch drum assembly 14, is connected to the first hub assembly 15 by engagement of the first clutch C1. The first clutch C1 is locked by actuation of the first piston 17, as shown in FIG. 4. Therefore, the torque of the input shaft 12 is transferred to the first hub assembly 15.

The first hub assembly 15 is attached to the intermediate shaft 22, one end of which is attached to the sun gear 2S of the second planetary gearset 2. Thus, rotation of the first hub assembly 15 causes identical rotation of the sun gear 2S of the second planetary gearset 2, as shown in FIG. 7B.

When the transmission is set to D, 3, and 2, the one-way clutch F1 automatically prevents the ring gear 2R of the second planetary gearset 2 from rotating in a direction opposite the input shaft 2. However, the one-way clutch F1 allows the ring gear 2R to rotate in the same direction as the output shaft 3 in a situation where the vehicle is coasting downhill. As shown in FIGS. 7A and 7B, elements of the first planetary gearset 1 are allowed to freely rotate in response to operation of the second planetary gearset 2.

Torque which is transferred to the sun gear 2S of the second planetary gearset 2 is transferred to the planetary pinion gear 2P, which is engaged with the sun gear 2S and the ring gear 2R. Since the ring gear 2R is prevented from rotating in a direction opposite the sun gear 2S, the planetary pinion gear carrier 2C rotates in the same direction as the sun gear 2S along the internal surface of the ring gear 2R, as shown in FIG. 7B.

When the transmission is set to the 1 range, the second brake B2 is applied. This prevents the ring gear 2R from rotating in the same direction as the sun gear 2S and the input shaft 12, which allows engine braking to occur.

Second Gear

Figure 8A:
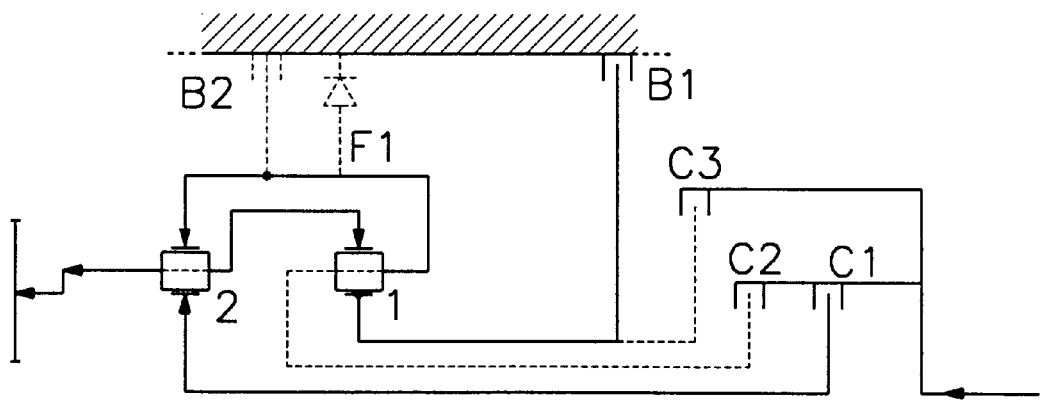
FIG. 8A is a schematic diagram showing the power transfer path of an automatic variable transmission embodying the present invention when the transmission is operating in a second gear.
Figure 8B:
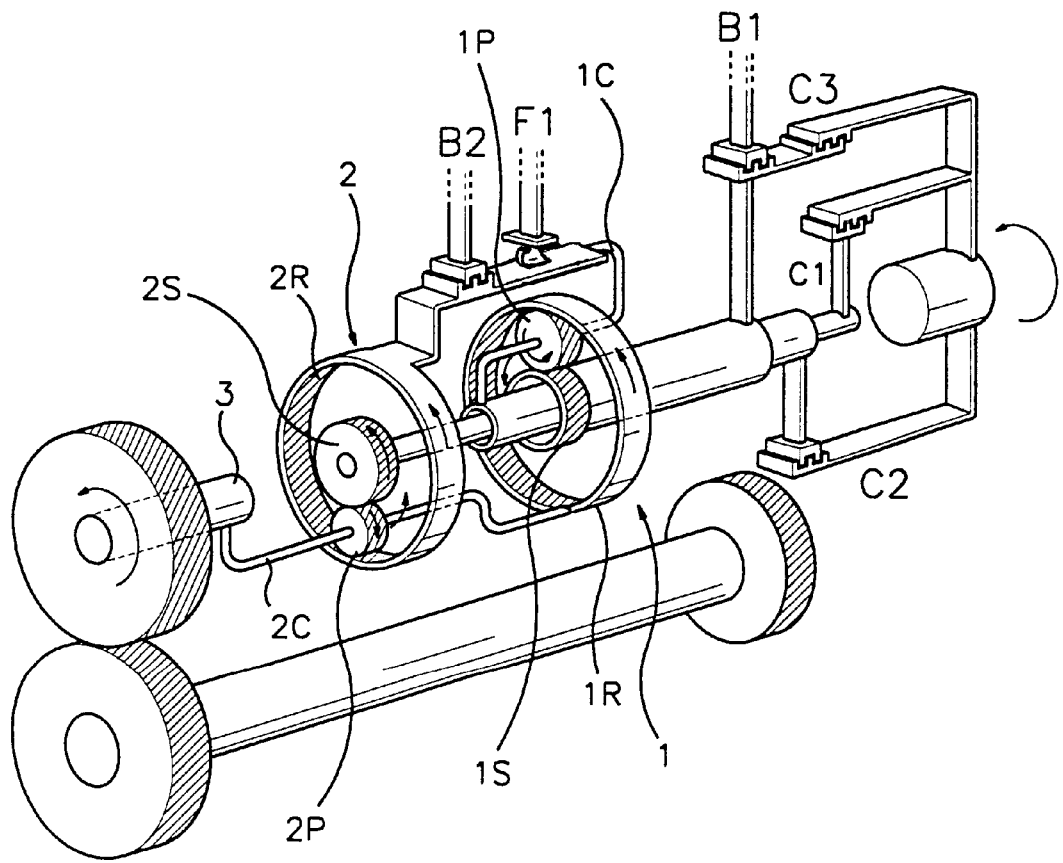
FIG. 8B is an exploded perspective view showing rotating states of planetary gearsets of the transmission according to the power transfer path of FIG. 8A.

The operational states of the elements of the transmission in the second gear will now be explained with reference to FIGS. 8A and 8B. The first clutch C1 is still engaged, which causes torque from the input shaft 12 to be transferred to the first hub assembly 15 through the clutch drum assembly 14. The first intermediate shaft 22 is fixed to the first hub assembly 15 at one end and the sun gear 2S of the second planetary gear set at the other end. Therefore, rotation of the first hub assembly 15 causes identical rotation of the first intermediate shaft 22 and the sun gear 2S.

The first brake B1, which is attached to the inside of the transmission casing 40 via a spline is applied by actuation of the piston 24. The first brake B1 prevents rotation of the third hub assembly 19, and thus the sun gear 1S of the first planetary gearset 1. Rotation of the planetary pinion gear 2P both around its own axis and the axis of the sun gear 2S is caused by rotation of the sun gear 2S. The ring gear 2R, which is fixed to the planetary pinion gear carrier 1C, rotates in the same direction as the sun gear 2S.

The ring gears 1R and 2R, the planetary pinion gear carriers 1C and 2C, and the sun gear 2S all rotate in the same direction as the input shaft 12. Also, the planetary pinion gear 1P rotates around its own axis and the axis of the sun gear 1S in the same direction of rotation as that of the input shaft 12. The planetary pinion gear 2P rotates around the axis of the sun gear 2S in the same direction of rotation as that of the input shaft 12, however, the planetary pinion gear 2P rotates around its own axis in a direction opposite that of the input shaft 12.

By this arrangement, torque is transmitted through the planetary pinion gear carrier 2C and the ring gear 1R to the output shaft 3.

Third Gear

Figure 9A:
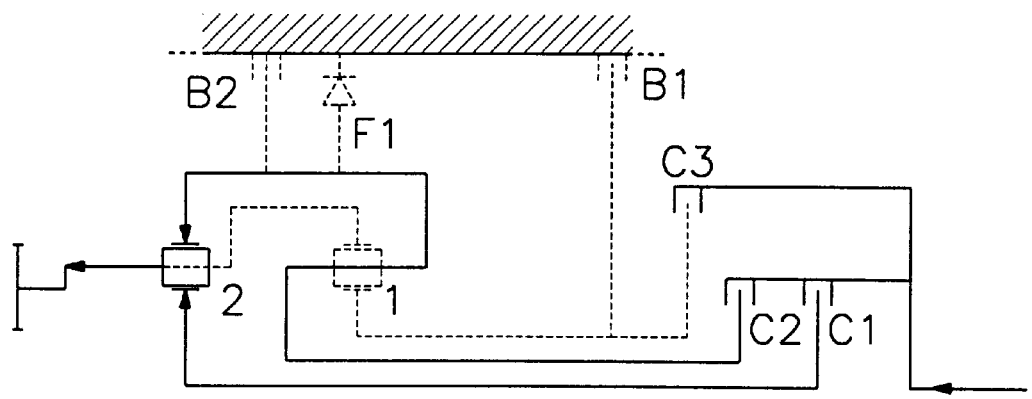
FIG. 9A is a schematic diagram showing the power transfer path of an automatic variable transmission embodying the present invention when the transmission is operating in a third gear.
Figure 9B:
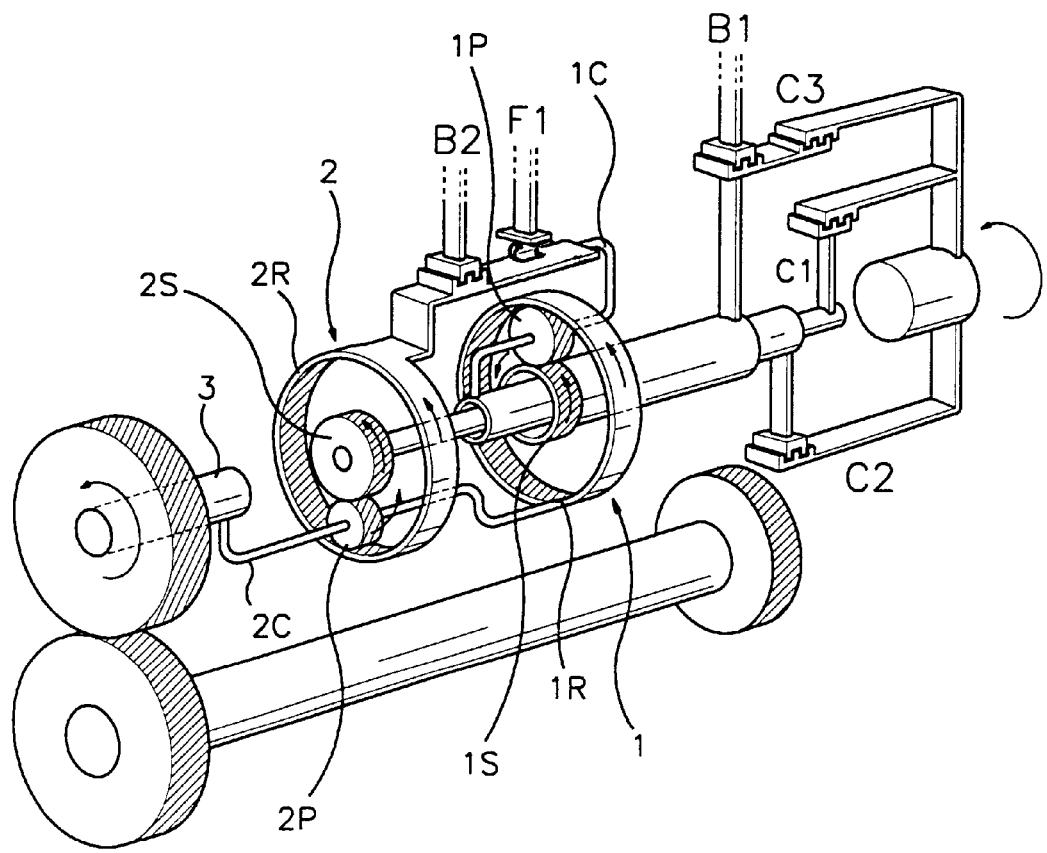
FIG. 9B is an exploded perspective view showing rotating states of planetary gearsets of the transmission according to the power transfer path of FIG. 9A.

A description of the operating states of the elements of the transmission when in the third gear will now be described with reference to FIGS. 9A and 9B.

In third gear, the first clutch C1 and the second clutch C2 are engaged. The first brake B1 may also be applied when the transmission is in the third gear range setting to allow engine braking to occur. When the first brake B1 is applied, it functions identically to the first brake B1 when the transmission is in second gear with the transmission setting at 2.

Torque from the engine rotates the input shaft 12, which is fixed to the clutch drum assembly 14. The first hub assembly 15 rotates because it is locked to the clutch drum assembly 14 by engagement of the first clutch C1. The first intermediate shaft 22, which is fixed to the first hub assembly 15 at one end and the sun gear 2S of the second planetary gearset 2 at the other end, causes the sun gear 2S to rotate in the same direction as the input shaft 12.

The second hub assembly 16 rotates because it is locked to the clutch drum assembly 14 by engagement of the second clutch C2. The second intermediate shaft 23, which is fixed to the second hub assembly 16 at one end and the planetary pinion gear carrier 1C of the first planetary gearset 1 at the other end, causes the planetary pinion gear carrier 1C to rotate in the same direction as the input shaft 12.

Rotation of the planetary pinion gear carrier 1C causes rotation of the planetary pinion gear 1P around the axis of the sun gear 1S. Rotation of the sun gear 2S of the second planetary gearset 2 and rotation of the planetary pinion gear carrier 1P of the first planetary gearset 1 causes rotation of the planetary pinion gear 2P around the axis of the sun gear 2S. The rotation of the planetary pinion gear 2P causes rotation of the planetary pinion gear carrier 2C and the ring gear 1R. This arrangement transmits torque from the input shaft 12 to the output shaft 3, and causes output shaft 3 to rotate at the same speed as the input shaft 12, which results in a nominal gear ratio of 1:1.

The ring gears 1R and 2R, the planetary pinion gear carriers 1C and 2C, and the sun gear 2S all rotate in the same direction as the input shaft 12. The planetary pinion gears 1P and 2P rotate around the axis of the sun gear 1S in the same direction of rotation as the input shaft 12. The planetary pinion gears 1P and 2P, however, do not rotate around their axis.

When the transmission is set in the third gear position, and the transmission is operated in third gear, the second brake B2 is applied so that engine braking can occur. The application of the second brake B2 prevents the ring gear 2R and the planetary pinion gear carrier 1C from rotating, which ensures that torque may be transferred from the output shaft 3 to the engine.

Fourth Gear

Figure 10A:
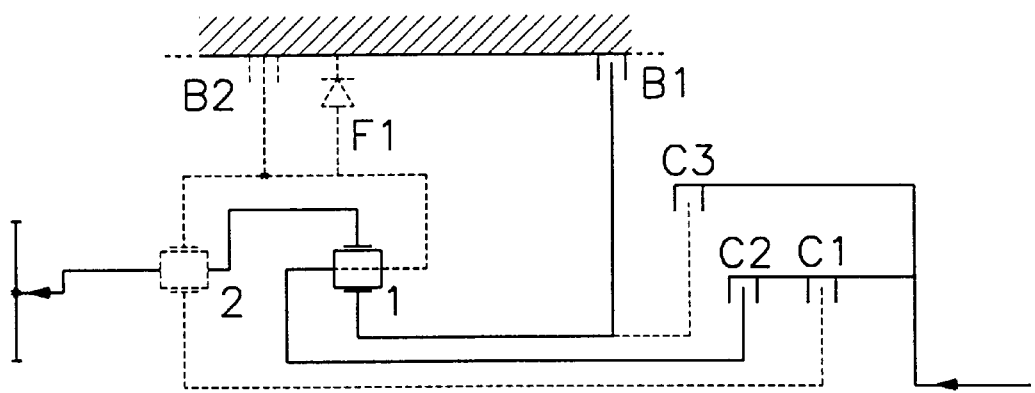
FIG. 10A is a schematic diagram showing the power transfer path of an automatic variable transmission embodying the present invention when the transmission is operating in a fourth gear.
Figure 10B:
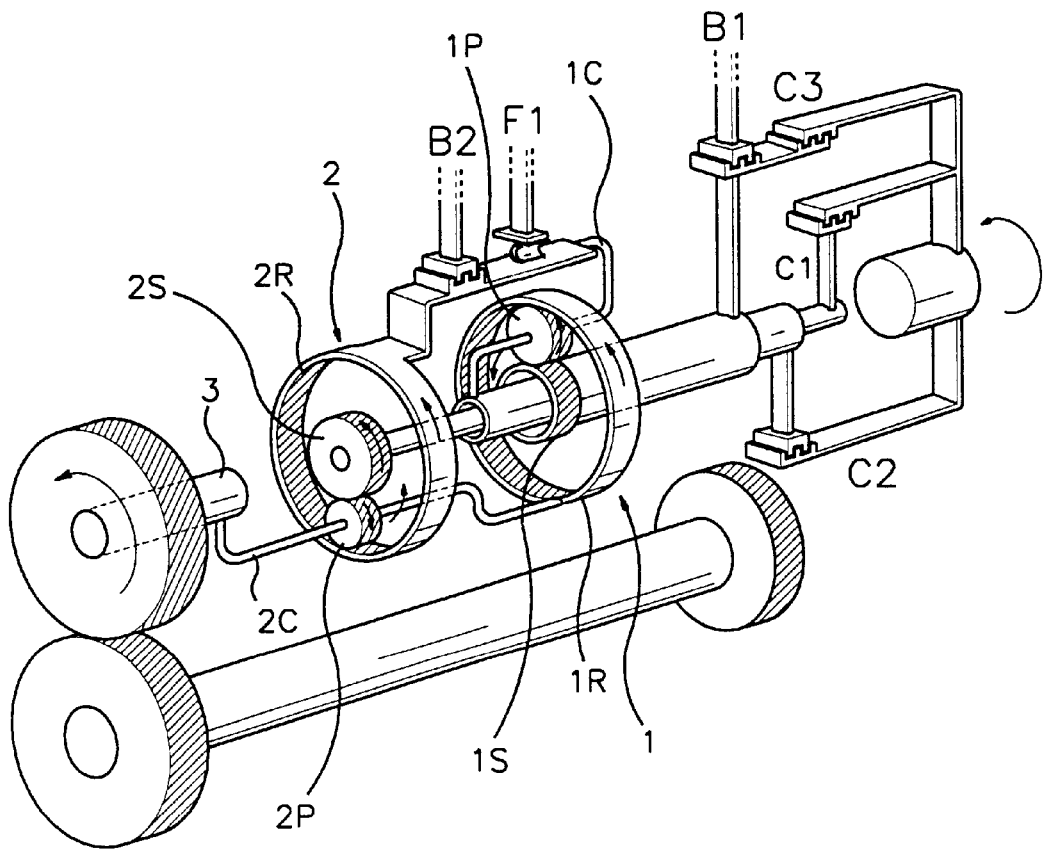
FIG. 10B is an exploded perspective view showing rotating states of planetary gearsets of the transmission according to the power transfer path of FIG. 10A.

A description of the operating states of the elements of the transmission in the fourth gear will now be explained with reference to FIGS. 10A and 10B. In the fourth gear, the second clutch C2 is engaged and the first brake B1 is applied. When the transmission is set to (D) Drive, the first brake B1 is applied to allow engine braking to occur. The first brake B1 functions identically to the first brake B1 when the transmission operates in second gear with the transmission setting at 2.

Torque from the engine rotates the input shaft 12, which is fixed to the clutch drum assembly 14. The second hub assembly 16 rotates because it is locked to the clutch drum assembly 14 by engagement of the second clutch C2. The second intermediate shaft 23, which is fixed to the second hub assembly 16 at one end and the planetary pinion gear carrier 1C of the first planetary gearset 1 at the other end, causes the planetary pinion gear carrier 1C to rotate in the same direction as the input shaft 12.

Rotation of the planetary pinion gear carrier 1C causes rotation of the planetary pinion gear 1P around its own axis and the axis of the sun gear 1S. The application of the first brake B1 prevents rotation of the third hub assembly 19 and the sun gear 1S of the first planetary gearset. Thus, the ring gear 1P rotates in the same direction as the planetary pinion gear 1P and the planetary pinion gear carrier 1C. Thus, the planetary pinion gear carrier 2P, which is attached to the ring gear 1R, also rotates in the same direction as the input shaft 12, which transmits torque to the output shaft 3.

The ring gears 1R and 2R, the planetary pinion gear carriers 1C and 2C, and the sun gear 2S all rotate in the same direction as the input shaft 12. The planetary pinion gears 1P rotate around their own axes and the axes of the sun gears 1S and 2S in the same direction of rotation as that of the input shaft 12.

In FIGS. 6B, 7B, 8B, 9B and 10B arrows indicate the direction of rotation of the elements of the planetary gearsets. If no arrow is shown, this indicates that an element is in a locked state.

Each frictional operating element of the automatic variable transmission described above, particularly each clutch and brake, is controlled and operated by a hydraulic control system embodying the present invention. A description of the hydraulic control system will now be provided with reference to FIGS. 11–23.

Figure 11:
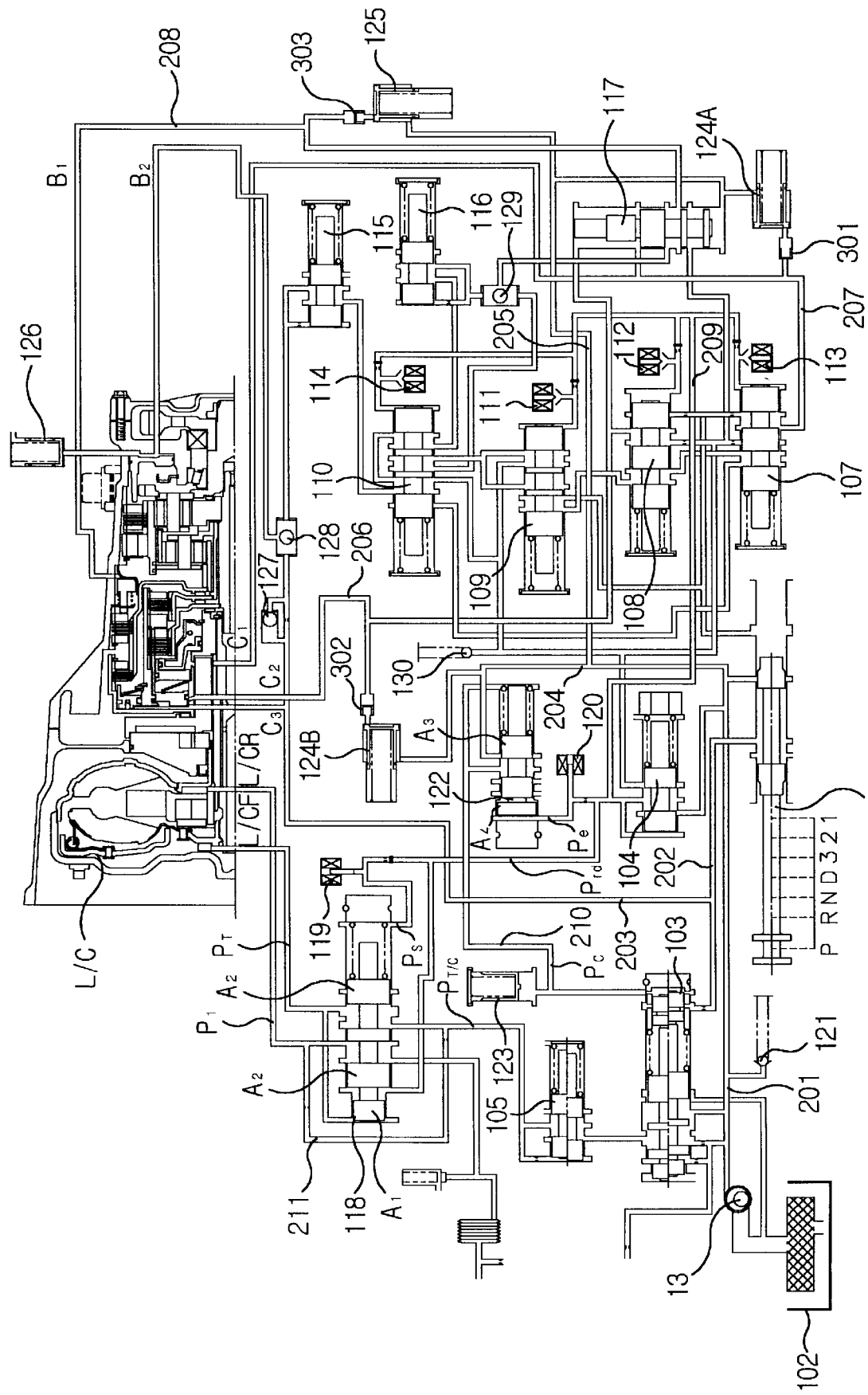
FIG. 11 is a diagram of a hydraulic pressure control system of an automatic variable transmission embodying the present invention.

FIG. 11 is a diagram showing a construction of a hydraulic pressure control system embodying the present invention. The hydraulic control system includes a manual valve 101 controlling a flow direction of hydraulic fluid in response to a selected transmission range. The manual valve 101 is connected through a first passageway 201 to a hydraulic fluid pump 13 which is operated by power received from an engine. The first passageway 201 is connected to a line pressure adjusting valve 103, which adjusts the pressure of hydraulic fluid applied to each of the operating elements of the transmission other than the manual valve 101. The system also includes a pressure reducing valve 104 for reducing the line pressure of hydraulic fluid, and a pilot valve 122 for reducing the pressure of hydraulic fluid supplied by the line pressure adjusting valve 103 to a pilot pressure.

A relief valve 105 is connected to the line pressure adjusting valve 103. A lock-up control valve 118 is connected to the relief valve 105. The lock-up control valve 118 supplies hydraulic fluid to a lock-up clutch L/C.

A lock-up control solenoid valve 119 for selectively supplying hydraulic fluid from the pilot valve 122 is provided in a passageway connecting the lock-up control valve 118 and the pressure reducing valve 104. This solenoid valve 119 selectively opens or closes the hydraulic fluid passageway so that lock-up control is possible.

In addition, a duty solenoid valve 120 is provided in the passageway connecting the pressure reducing valve 104 and the pilot valve 122. The pilot valve 122 sets a magnitude of the required line pressure based on the degree of throttle valve opening and the output speed of the transmission.

In addition, a surge controlling accumulator 123 is provided in the passageway connecting the line pressure adjusting valve 103 and the pilot valve 122 to prevent a pulsating phenomenon.

The manual valve 101 is connected through a number of passageways to each operating element; e.g., the first, second and third clutches, and the first and second brakes. In these passageways, a number of operating element control valves are provided for controlling hydraulic fluid pressure according to the selected transmission range. The control valves include a first clutch valve 107, a second clutch valve 108, a direction shifting valve 109, and a third clutch valve 110. The respective operating element control valves are connected via various passageways to the pilot valve 122 via the pressure reducing valve 104. Four normally open type solenoid valves 111, 112, 113, 114 are provided in the passageways connecting the respective operating element control valves and the pressure reducing valve 104. The solenoid valves receive signals from an electromagnetic control unit (not shown) and execute on/off operations. The solenoid valves control application of hydraulic pressure from the pressure reducing valve 104 to respective ones of the operating element control valves. This causes a spool of the operating element control valve to move, whereby a hydraulic fluid passageway is opened or closed.

A Here, the third clutch valve 110 is used to apply hydraulic fluid to first and second brake pressure reducing valves 115, 116 to control the first and second brakes B1 and B2 when engine braking is required. When engine braking is required, low pressure hydraulic fluid is supplied to the first and second brakes B1, B2 through the pressure reducing valves 115 and 116.

Accumulators 124A, 124B, 125 and 126 for the first, second and third clutches, and the first brake, are provided in the passageways connecting the respective operating element control valves and the respective operating elements of the transmission. The accumulators are used as a means for preventing abrupt pressure changes from being applied to the operating elements. In addition, orifice check valves 301, 302, 303 are provided at passageway inlets of the accumulators 124A and 124B for the first and second clutches and the accumulator 125 for first brake. The check valves 301, 302, and 303 regulate a flow quantity within the accumulators to allow hydraulic fluid to be slowly discharged upon the release of the operating pressure. This ensures that a shift delay does not occur.

The control system also includes a safety valve 117 which prevents hydraulic fluid pressure from being supplied to incorrect operating elements while the transmission is operating in each range. Specifically, the safety valve 117 prevents the first brake B1 from being applied when either the first clutch C1 or the second clutch C2 are engaged, thereby preventing the occurrence of an interlock phenomenon due to damage of a solenoid valve or an operating element control valve.

In a hydraulic control system as described above, a compensated hydraulic pressure Pc is controlled by the line pressure adjusting valve 103. The pressure is varied, depending upon conditions, in response to a signal from the electromagnetic control unit.

A description of the lock-up control will be described with reference to FIG. 11. A pressure controlled by the lock-up controlling solenoid valve 119 is designated as Ps, and a pressure adjusted by the pilot valve 122 is designated as Prd. Also, a pressure in a tenth passageway 210, adjusted by the pilot valve 122, is designated as Pc. Areas of the two control surfaces that are exposed to the pilot pressure are designated as $A_3$ and $A_4$. A pressure applyed to the area $A_4$ by the duty solenoid valve 120 is designated as Pe. A spring force of the pilot valve 122 is designated as Fsp. The equation $Pc-(A_4/A_3)Pe-Fsp/A_3$) describes the relationship between the pressures and spring force, wherein Pe is a pressure adjusted electronically by the duty solenoid valve 120.

A fluid pumped from a hydraulic pump 13 is delivered to a relief valve 105 through line pressure adjusting valve 103. The relief valve 105 controls the fluid to a predetermined pressure of 7 kgf/mm$^2$, and supplies fluid at this pressure to the lock-up control valve 118. The pressure controlled to 7 kgf/mm$^2$ is designated as $P_{T/C}$. A pressure of the fluid operating the lock-up control valve 118, which is supplied to the passageway communicating with the front chamber of the lock-up clutch L/CF is designated as $P_T$. A pressure of fluid supplied to the rear chamber of the lock-up clutch L/CR is designated as $P_1$. The equation $PsA_2+Fs=Prd(A_2-A_1)+P_T A_1$ describes the relationships between the pressures, spring force and areas. Therefore, $P_T=(A_2/A_1)Ps+\{Fs-Prd(A_2-A_1)\}A_1$.

Accordingly, the pressure $P_1$, upon lock lock-up operations (upon slip control starting), is always equal to the pressure $P_{T/C}$. Thus, the pressure is always maintained at less than 7 kgf/mm$^2$.

Therefore, $P_1$ and $_{PT/C}$ are always controlled to the same pressure, and the lock-up pressure $P_T$ can be supplied to the front chamber of lock-up clutch L/CF through the lock-up control valve 118 by continuous operation of the lock-up controlling solenoid valve 119. That is, the force of $P_{T/C}$ is supplied constantly, and the lock-up force is lowered if the lock-up pressure $P_T$ is increased. On the other hand, the lock-up force is raised if the lock-up pressure $P_T$ is decreased. Accordingly, a desired lock-up quantity can be controlled by controlling a force of $P_T$ relative to $P_1$, so as to control the objective slip quantity by judging a relative slip quantity.

The control of the various components in each drive range will now be described with reference to FIGS. 12–23.

When the manual valve 101 is positioned at the "D" position, the line pressure is supplied to the respective operating element control valves by the manual valve 101. Here, the supply of hydraulic fluid pressure to the first and second clutches C1 and C2 is made through operation of respective on/off valves and solenoid valves. Hydraulic fluid pressure is supplied to the first brake and second brake by a combination of the direction shifting valve 109, and the overdrive or third clutch valve 110 and the first or second brake pressure reducing valves 115 and 116.

Hydraulic fluid pressure is supplied to the first brake by operation of the solenoid valve 111. When engine braking is required in the first speed, the solenoid valve 114 is turned 'on', so that low pressure hydraulic fluid from the second brake pressure reducing valve 115 is supplied to the second brake B2. When engine braking is required in the second, third and fourth speeds, hydraulic fluid is supplied to the passageway to first brake through the first brake pressure reducing valve 116 so that low pressure hydraulic fluid is supplied to the first brake B1.

In accordance with the present invention, the transmission is operated at each gear or speed range by selectively engaging or applying the first clutch, the second clutch, the first brake and the second brake, which are independently operable. An optimum matching of operating and releasing times is controlled by the operation of solenoid valves. As a result, the interlock phenomenon or engine flare phenomenon, which is liable to be produced when the transmission changes gears, or where a transmission does not use the one way clutch, is eliminated. At the same time shift shock is absorbed.

N Range and P Range

Figure 12:
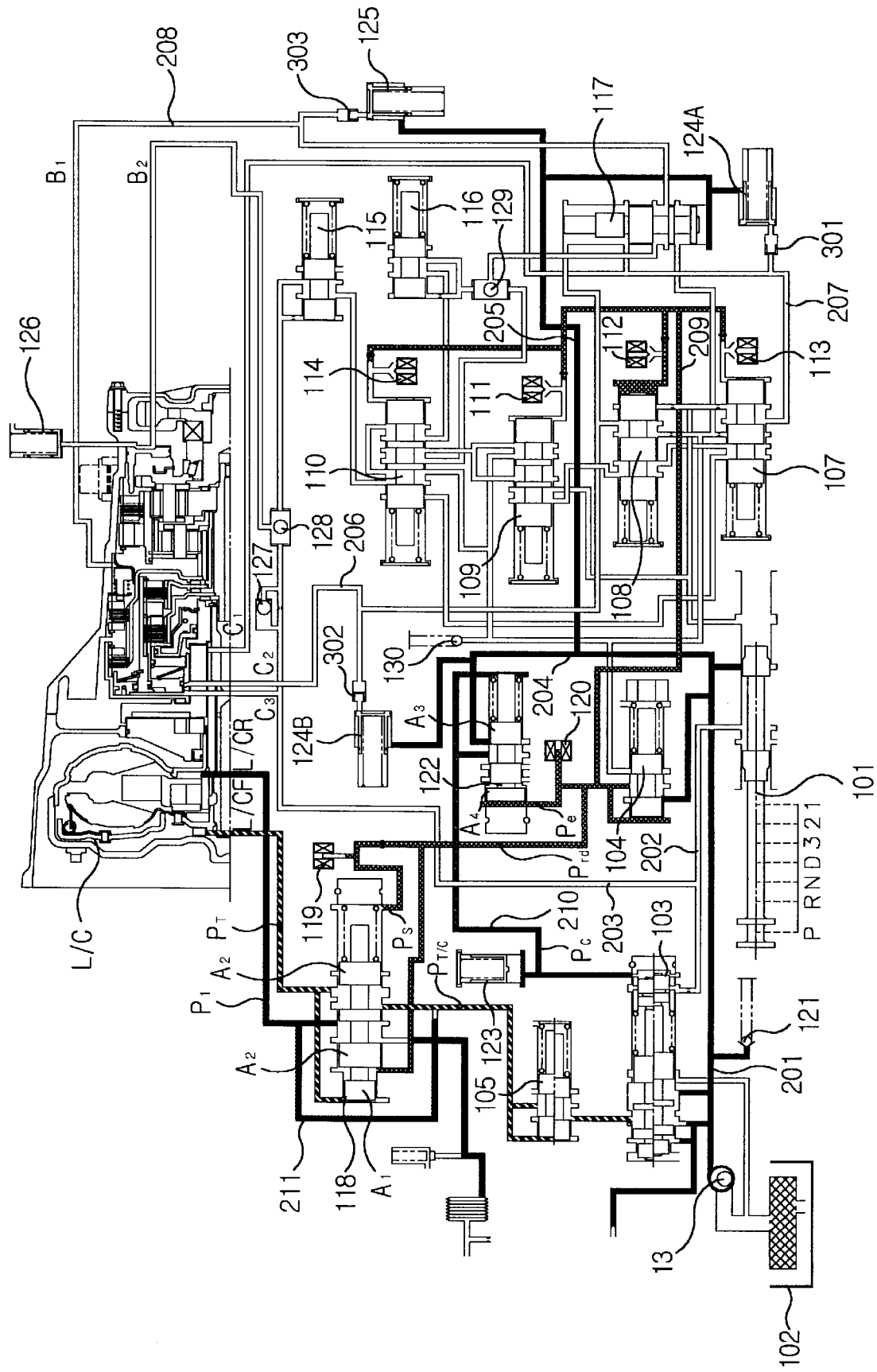
FIG. 12 is a diagram showing the states of the elements of a hydraulic control system of an automatic variable transmission embodying the invention when the transmission is operating in a park range.

These ranges are cases wherein the manual valve 101 is located at the P or N position in response to the operation of a transmission selecting lever (not shown). In the "P" range, as shown in FIG. 12, the manual valve 101 closes off the supply of hydraulic fluid pressure to all operating element control valves, clutch pistons and brake pistons so that connecting and transmitting operations of the operating elements are not made and a parking or neutral state is achieved. Each of the clutches and brakes are at their disengaged positions.

Figure 13:
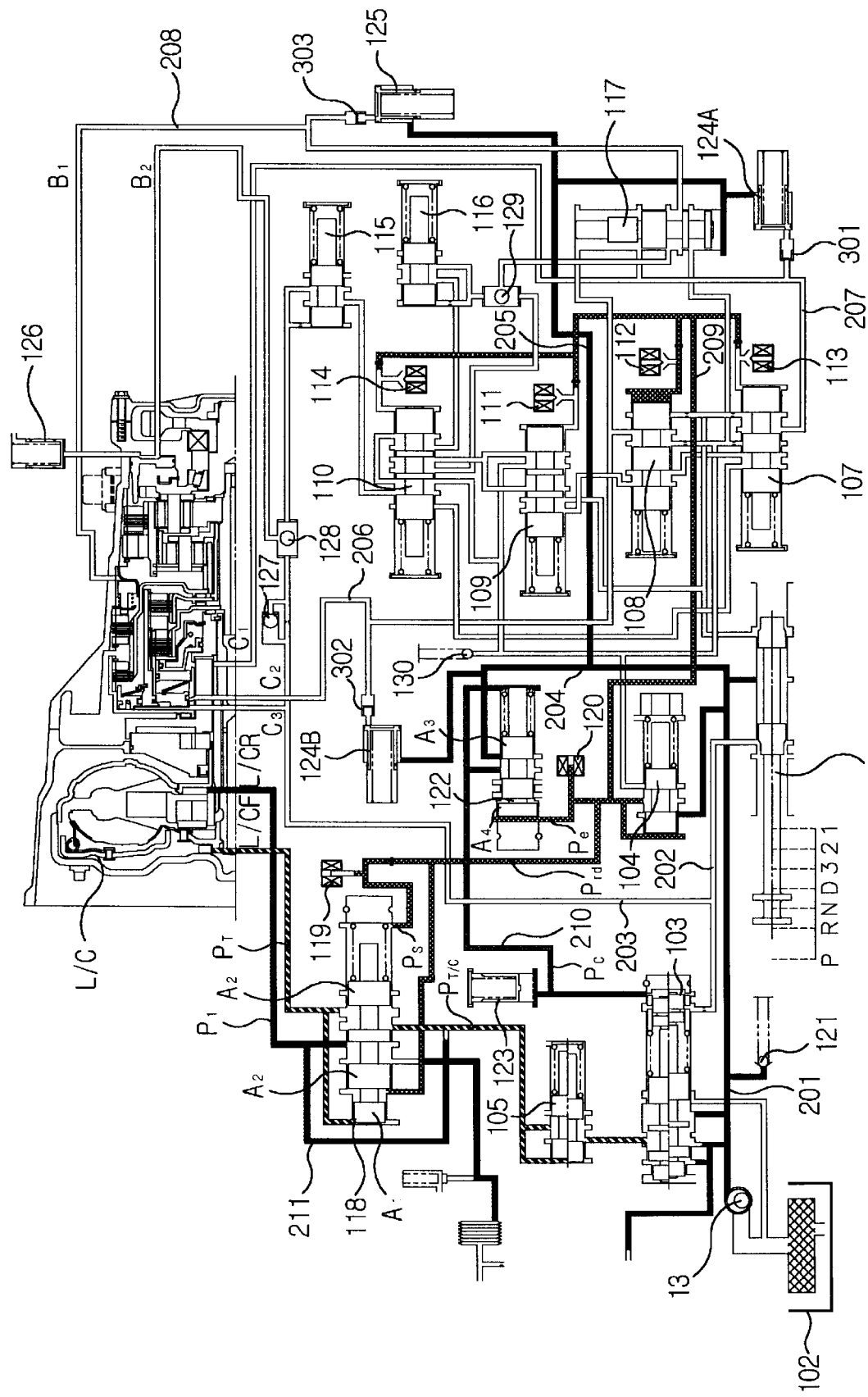
FIG. 13 is a diagram showing the states of the elements of a hydraulic control system of an automatic variable transmission embodying the invention when the transmission is operating in a neutral range.

When the engine operates with the transmission in the N range as shown in FIG. 13, the power of engine is not intended to be transferred to the output shaft. The respective control valves prevent hydraulic fluid pressure from passing to the operating elements. Excess hydraulic fluid pressure supplied to the passageways by the hydraulic fluid pump 13 is drained to a fluid tank 102 through a number of valves and an oil pump check valve 121 which is provided to the first passageway 201. Accordingly, only the position of the manual valve 101 is different in the N and P ranges, and the hydraulic fluid pressure is controlled in the same manner in the N range as in the case of the P range.

R Range

Figure 14:
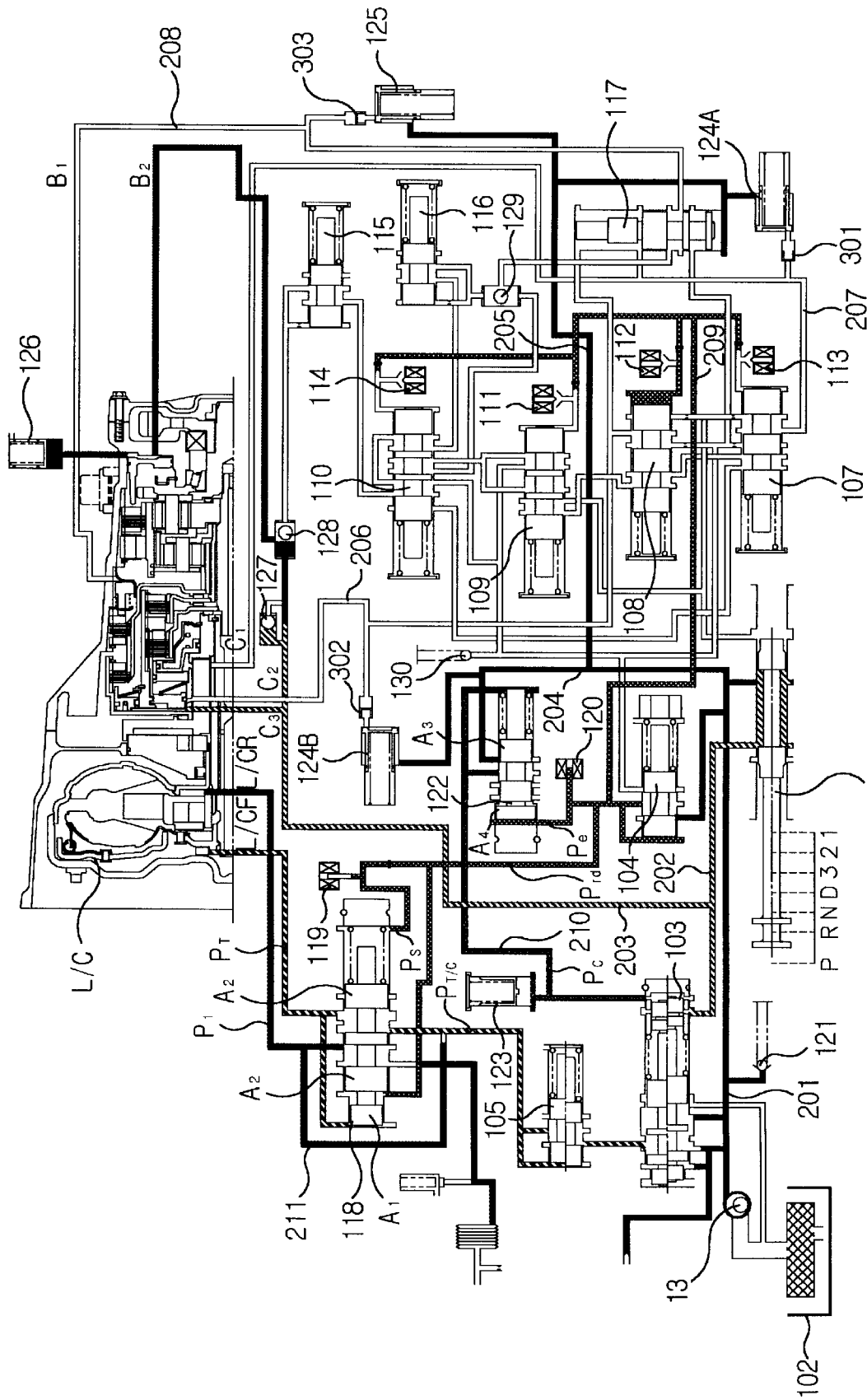
FIG. 14 is a diagram showing the states of the elements of a hydraulic control system of an automatic variable transmission embodying the invention when the transmission is operating in a reverse gear.

For this range, as shown in FIG. 14, the manual valve 101 is located at the R position and the second passageway 202, which communicates with the third clutch C3, and the second brake B2 of the transmission is opened so that pressurized hydraulic fluid is supplied to the third clutch piston and second brake piston. Here, the hydraulic fluid pressurized by the hydraulic pump 13 is supplied to the second passageway 202 and the third passageway 203 through the first passageway 201 and the manual valve 101. The fluid flows along the third passageway 203 which branches from the second passageway 202. The pressurized hydraulic fluid is also supplied to a line pressure adjusting valve 103 provided on the second passageway 202. When the fluid supplied through second passageway 202 reaches a predetermined pressure, the line pressure adjusting valve 103 drains excess fluid to the tank 102, so that the fluid flowing along the second passageway 202 and the third passageway 203 is maintained at a constant pressure.

The pistons 21, 26 actuating the third clutch C3 and the second brake B2 are operated when the pressure of the hydraulic fluid reaches a predetermined pressure. The third clutch C3 can prevent shift shock since the second piston 21 is not immediately operated by the applied hydraulic pressure, but rather operates only after the pressure is applied to and modulated by the accumulator 126 for the third clutch.

Hydraulic fluid pressure in the first passageway 201 is reduced to a predetermined pressure when passing through the pressure reducing valve 104. The reduced hydraulic fluid pressure then flows through the lock-up control valve 118 and the ninth passageway 209. In this range, second solenoid valve 112 is on.

D Range in First Gear

Figure 15:
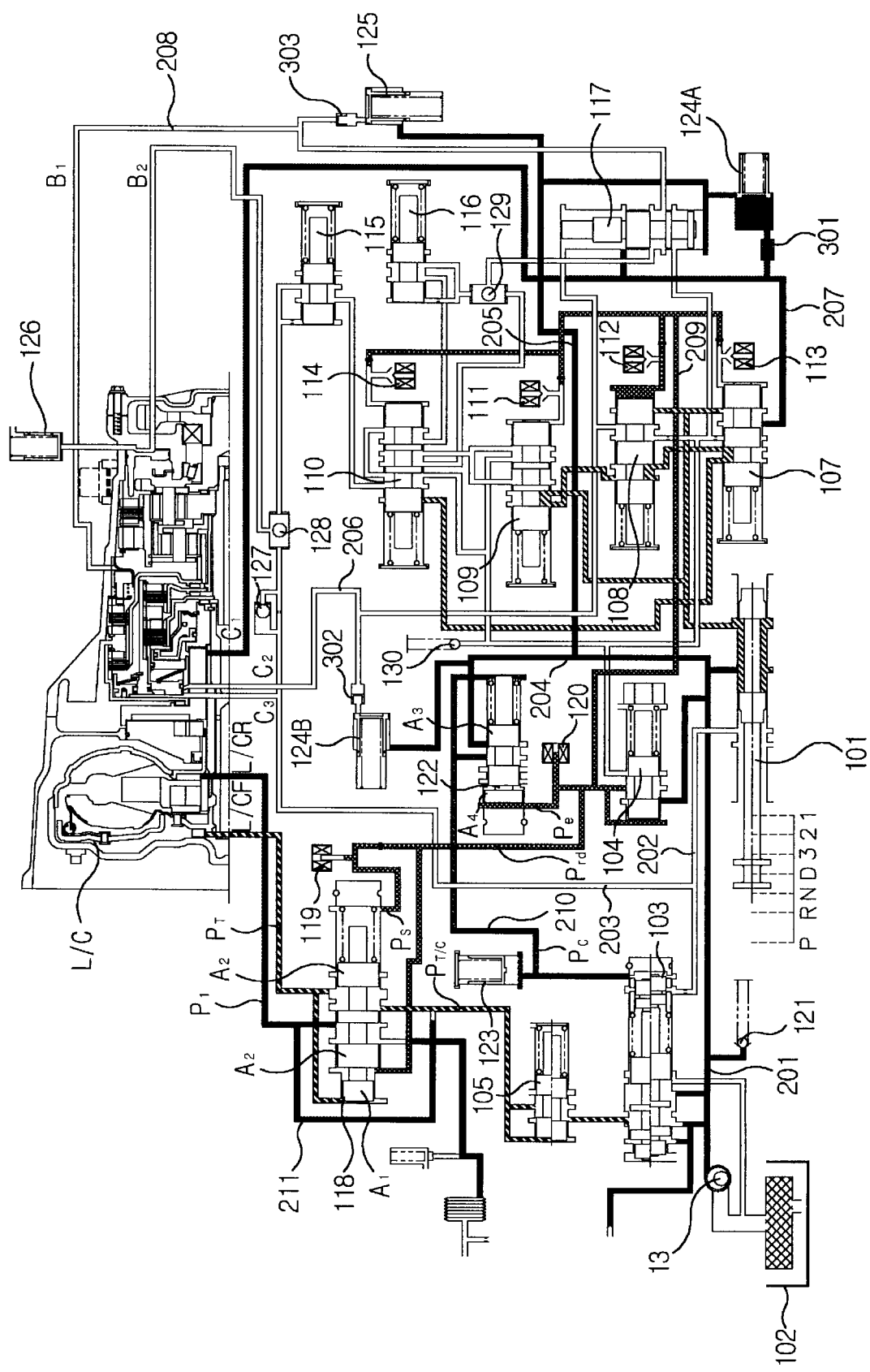
FIG. 15 is a diagram showing the states of the elements of a hydraulic control system of an automatic variable transmission embodying the invention when the transmission is operating in a first forward gear.

When the transmission is in the first gear -with the gear selection lever in the D range, as shown in FIG. 15, the manual valve is located at the D position, and pressurized hydraulic fluid flowing in the first passageway 201 is supplied to the first clutch C1 along, a seventh passageway 207. The first clutch C1 is engaged through activation of the solenoid valve 112, which activates the first clutch valve 107. The first clutch accumulator 124A and the safety valve 117 are provided on the seventh passageway 207. This first clutch accumulator 124A is provided for preventing shift shock when the first clutch C1 is operated. The safety valve 117 prevents errors in the operation of the hydraulic pressure control system from occurring.

First Gear With Engine Braking

Figure 16:
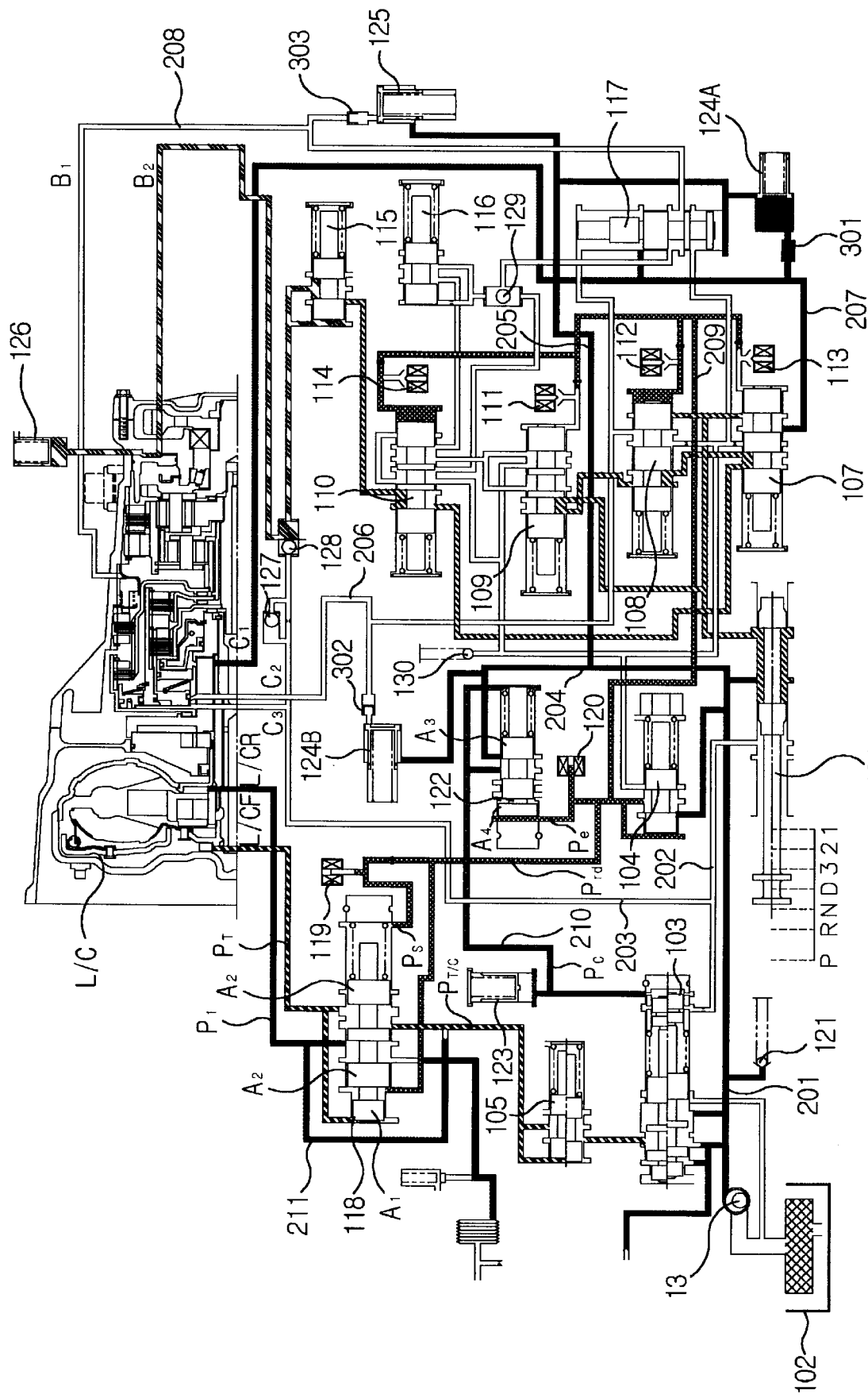
FIG. 16 is a diagram showing the states of the elements of a hydraulic control system of an automatic variable transmission embodying the invention when the transmission is operating with engine braking in a first forward gear.

When the transmission is operating in first gear, and the selection lever is in the first gear position, and the vehicle is coasting, engine braking can occur. As shown in FIG. 16, the fourth solenoid valve 114 is turned 'on' by the electromagnetic control unit, so that the third clutch valve 110 is operated. Accordingly, the passageway communicating with the second brake is supplied with low pressure hydraulic fluid through the second brake pressure reducing valve 115. This causes the second brake B2 to be applied, which allows engine braking to occur.

D Range in Second Gear

To shift to second gear from first gear, the first brake B1 must be applied. As the first solenoid valve 111 is turned 'on' by a signal from the electromagnetic control unit, the passageway communicating with the first brake B1 is opened, and pressurized hydraulic fluid is supplied to the first brake B1.

Figure 17:
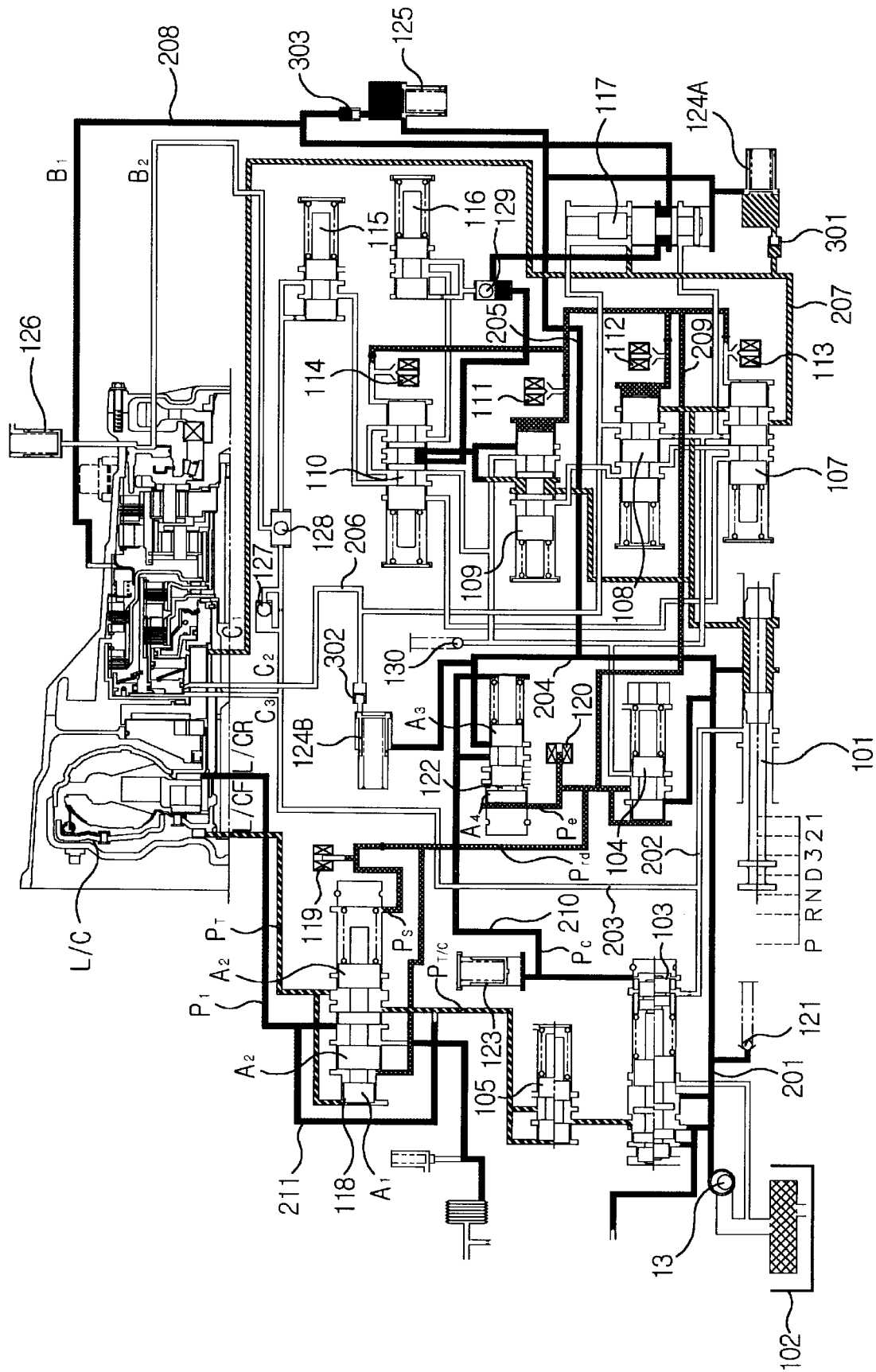
FIG. 17 is a diagram showing the states of the elements of a hydraulic control system of an automatic variable transmission embodying the invention when the transmission is operating in a second forward gear.

That is, as shown in FIG. 17, when the first solenoid valve 111 is actuated, the fluid flowing along the ninth passageway 209 is applied to the direction changing valve 109. Accordingly, the hydraulic fluid passing through the manual valve 101 flows through the direction shifting valve 109. The fluid passing through the direction shifting valve 109 is guided to the safety valve 117 by an operation of the check valve 129, and is supplied to the first brake B1 along the eighth passageway 208 through the safety valve 117. The hydraulic fluid supplied to the first clutch C1 is supplied through the accumulator 124A, and the hydraulic fluid applied to the first brake B1 is supplied through the accumulator 125. Accordingly, a driving power from the engine is gradually applied to the output shaft and a shift shock can be mitigated.

Second Gear with Engine Braking

Figure 18:
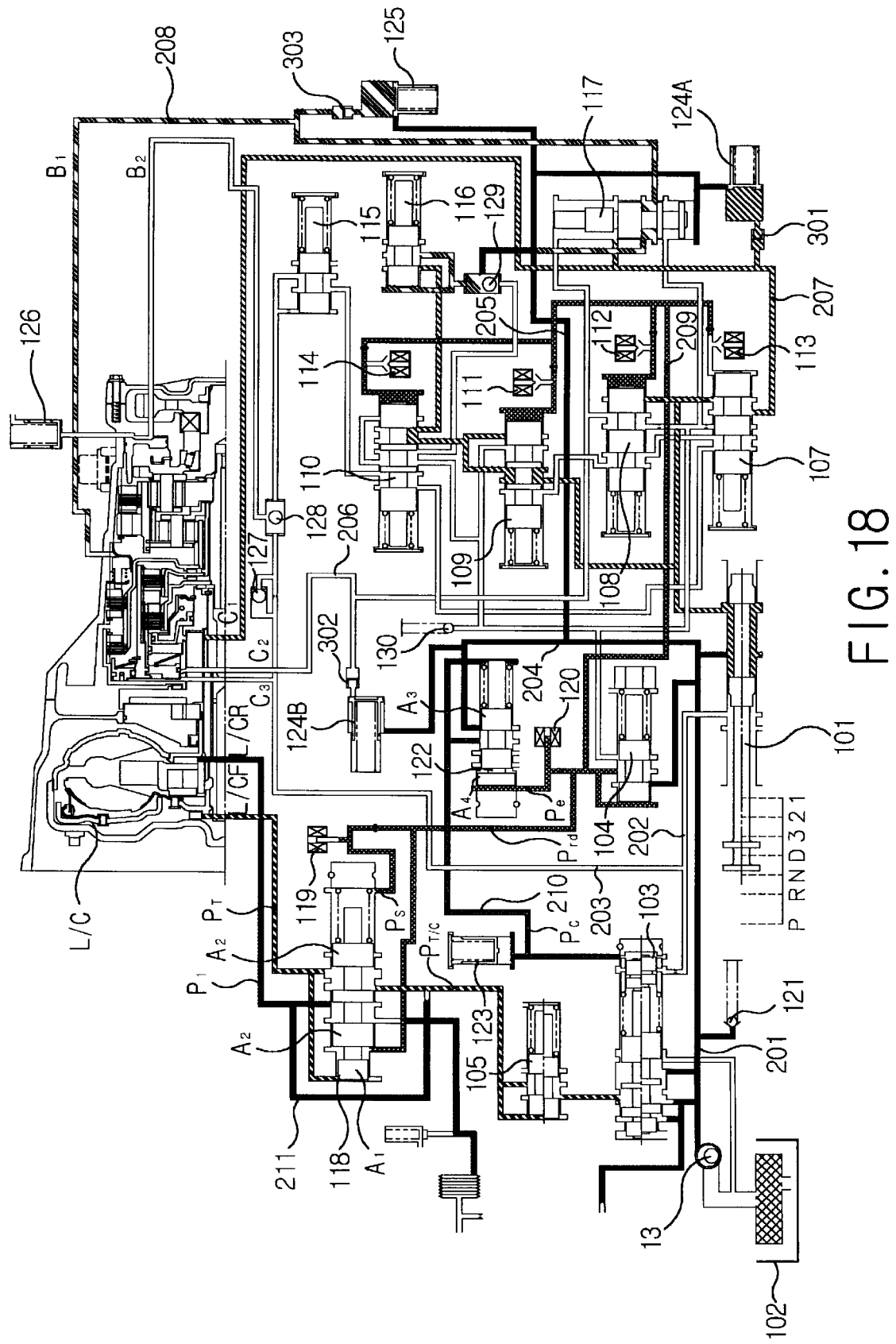
FIG. 18 is a diagram showing the states of the elements of a hydraulic control system of an automatic variable transmission embodying the invention when the transmission is operating with engine braking in a second forward gear.

Engine braking can occur when the transmission is in the second gear and the vehicle is coasting. As shown in FIG. 18, the states of the elements are similar to when the transmission is operating in the second gear without engine braking. When engine braking is desired, however, the fourth solenoid valve 114 is activated, which causes hydraulic fluid pressure to pass from the third clutch control valve 110 to the first brake B1 by passing through the first brake pressure reducing valve 116. In this configuration, low pressure hydraulic fluid is provided to the safety valve 117, and then to the first brake B1.

Partial Lock-Up in Second Gear

Figure 19:
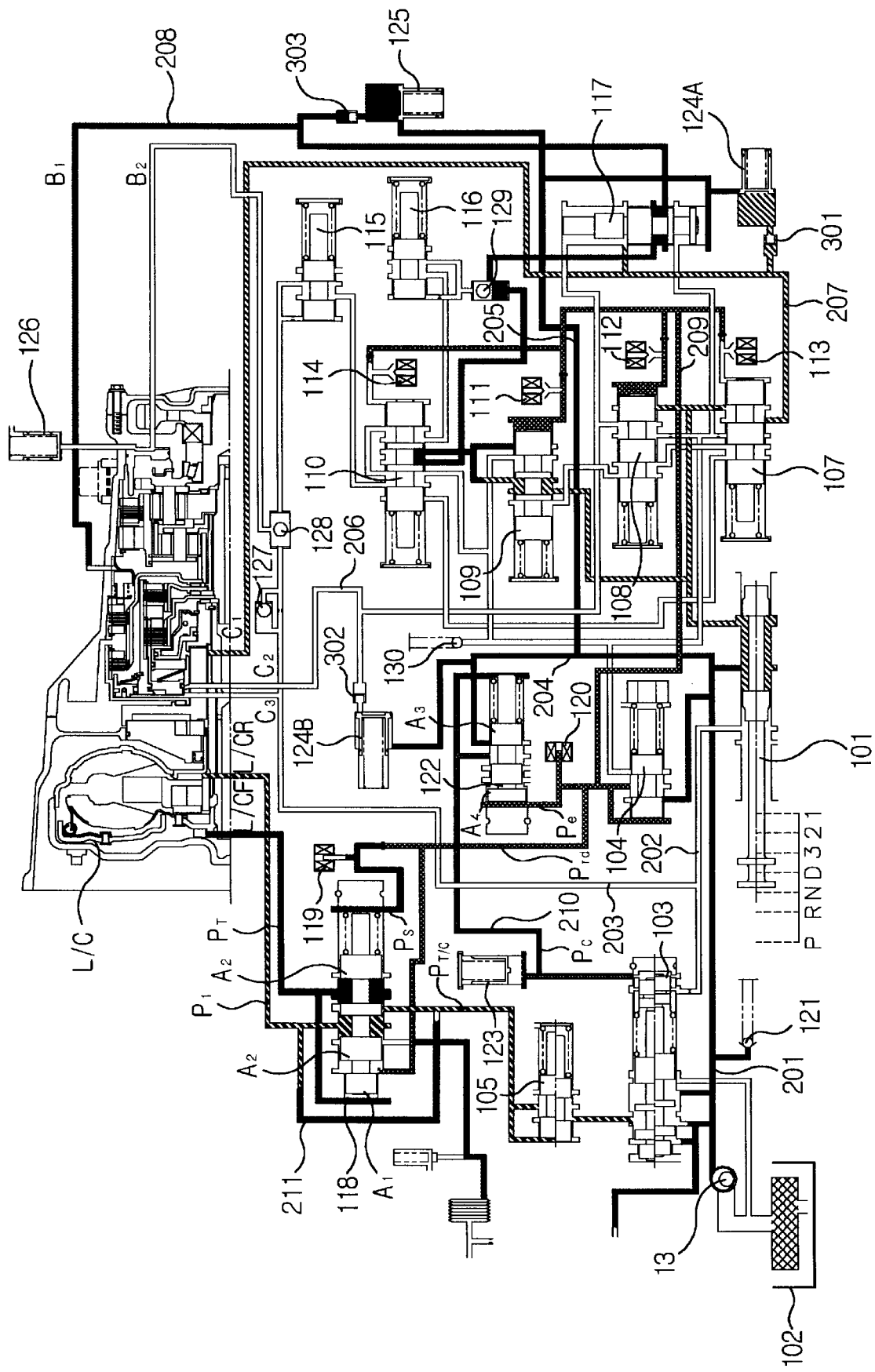
FIG. 19 is a diagram showing the states of the elements of a hydraulic control system of an automatic variable transmission embodying the invention when the transmission is operating in a partial lock-up state in a second forward gear.

Achieving a partial or full lock-up between the engine crankshaft and the input shaft of the transmission improves fuel efficiency, reduces engine speed, and lowers the operating temperature of the torque converter. To achieve a lock-up, as shown in FIG. 19, a signal is sent to the lock-up controlling solenoid valve 119, to vary the hydraulic fluid pressure supplied to the lock-up clutch 118. This causes the lock-up clutch to at least partially engage, and partial lock-up is achieved.

D Range in the Third Gear

Figure 20:
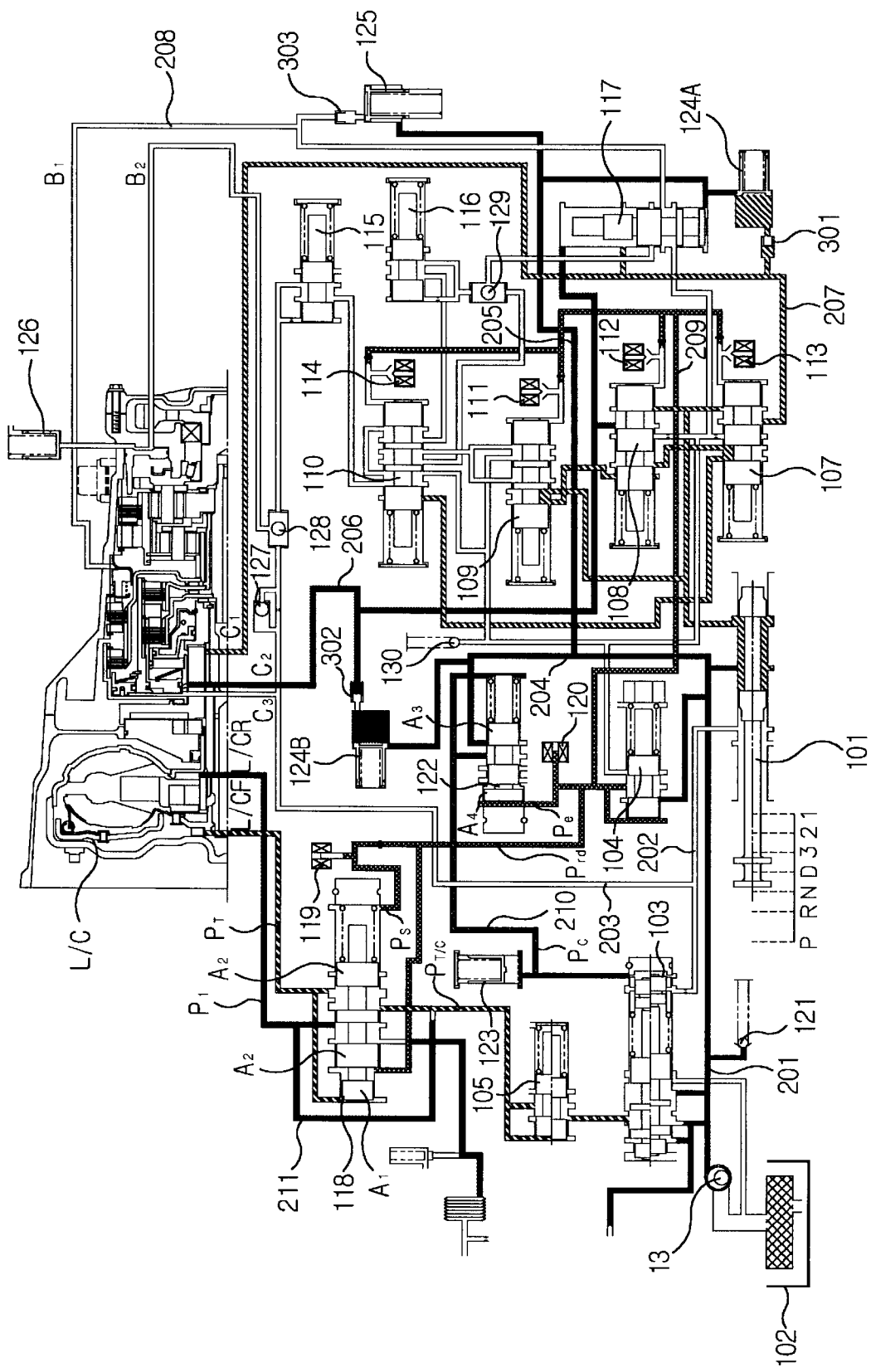
FIG. 20 is a diagram showing the states of the elements of a hydraulic control system of an automatic variable transmission embodying the invention when the transmission is operating in a third forward gear.

To shift the transmission from the second gear to the third gear, it is necessary to disengage the first brake B1 and engage the second clutch C2. As shown in FIG. 20, the second solenoid valve 112 is turned 'off' by an operation of the transmission control unit such that a direction of second clutch valve 108 is shifted. Accordingly, the hydraulic fluid passed through the first clutch valve 107 passes though the second clutch valve 108, whereby hydraulic fluid pressure is supplied to the second clutch C2, which causes the second clutch C2 to engage. The second clutch accumulator 124B provided on the passageway 206 prevents shift shock from occurring when the second clutch C2 is engaged.

At the same time, the first solenoid valve 111 is turned 'off', which prevents hydraulic fluid from being applied to the first brake B1. Also, since the pressure of the hydraulic fluid flowing to first and second clutches C1, C2 is applied in the same direction, the safety valve 117 operates to close the passageway leading to the first brake B1.

Partial Lock-Up in Third Gear

Figure 21:
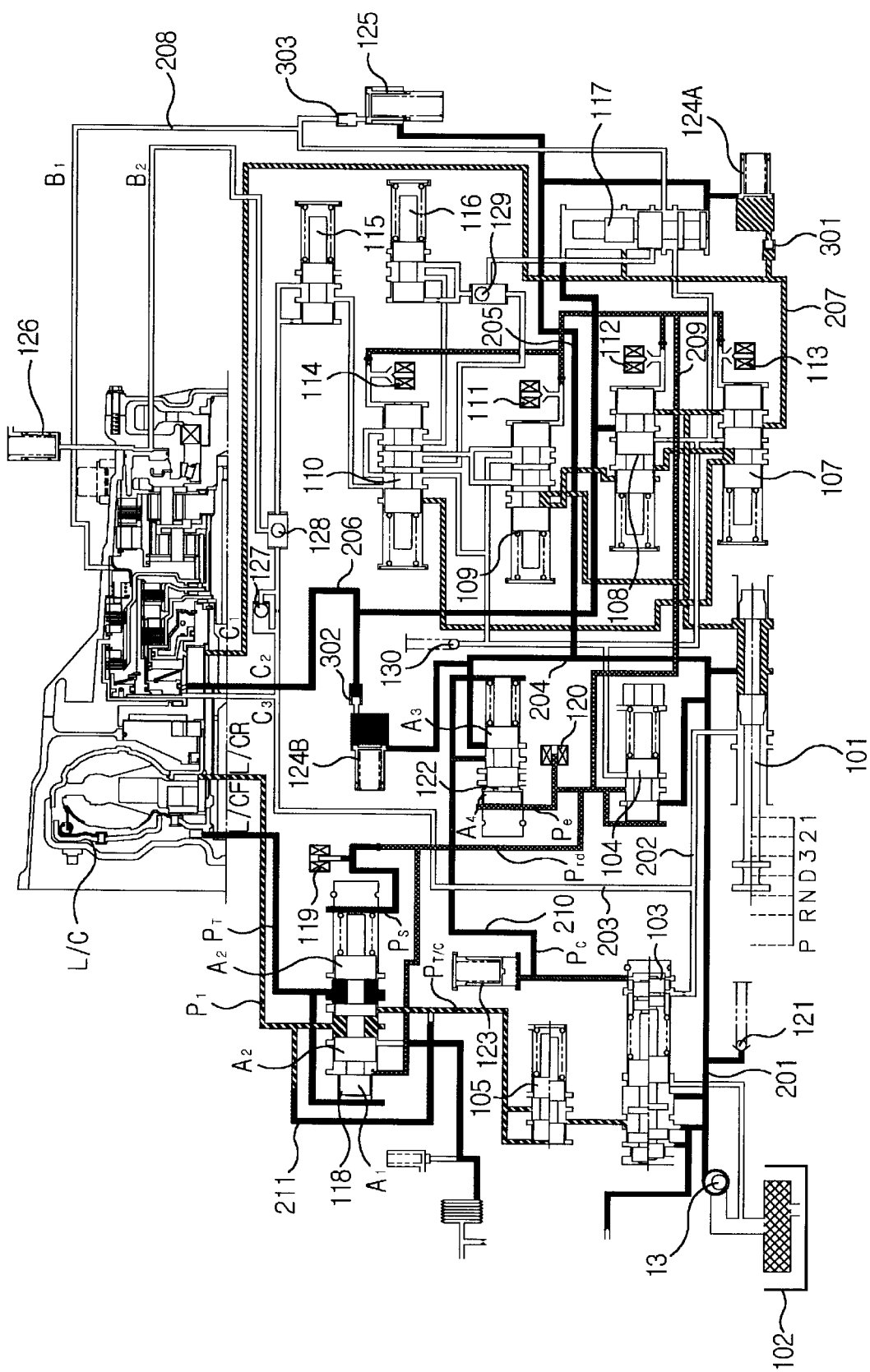
FIG. 21 is a diagram showing the states of the elements of a hydraulic control system of an automatic variable transmission embodying the invention when the transmission is operating in a partial lock-up state in a third forward gear.

Explanation for this condition, as shown in FIG. 21, is omitted because the partial lock-up in the third gear is the same as a partial lock-up in second gear, as explained above.

D Range in Fourth Gear

Figure 22:
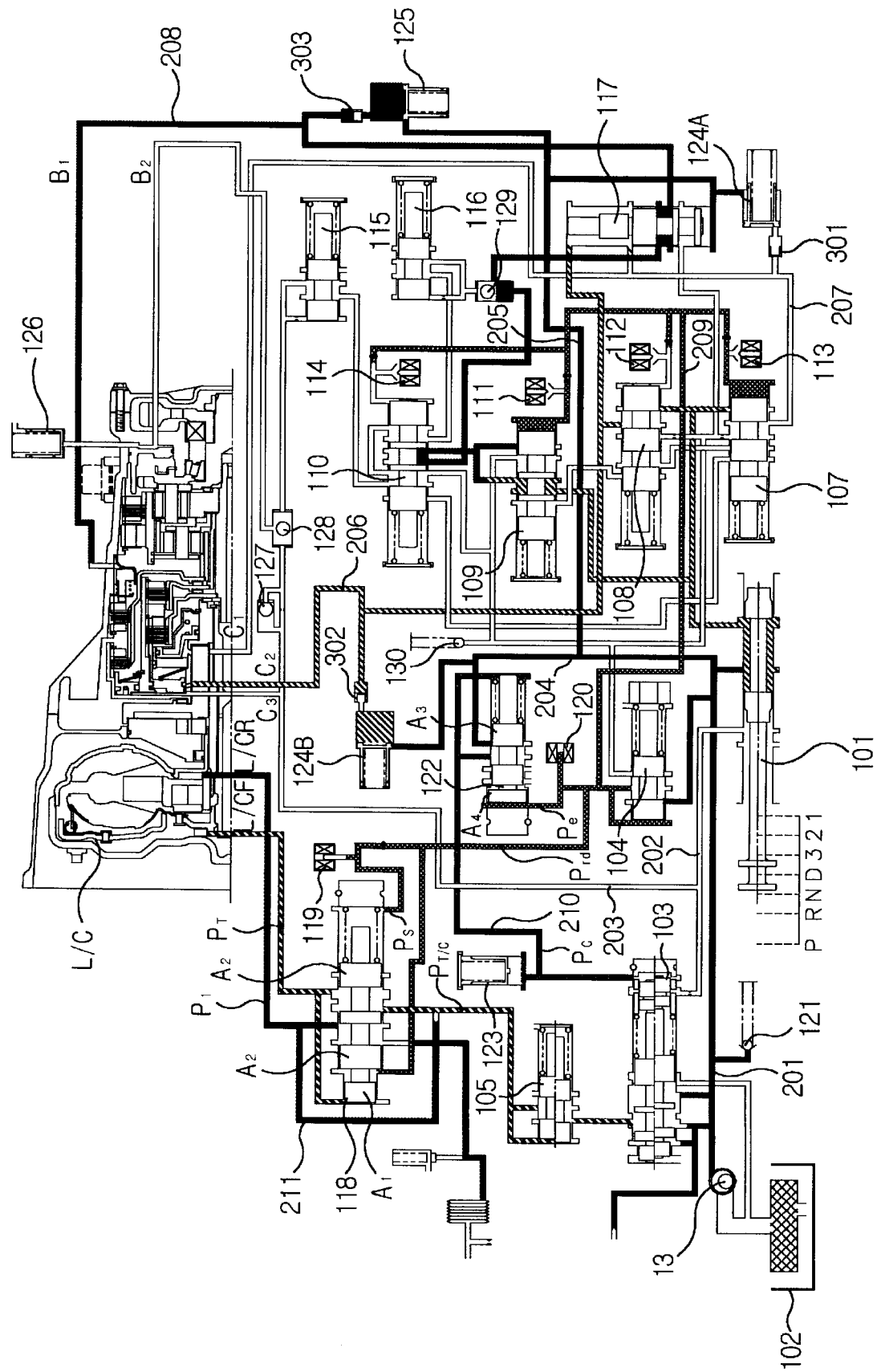
FIG. 22 is a diagram showing the states of the elements of a hydraulic control system of an automatic variable transmission embodying the invention when the transmission is operating in a fourth forward gear.
Figure 23:
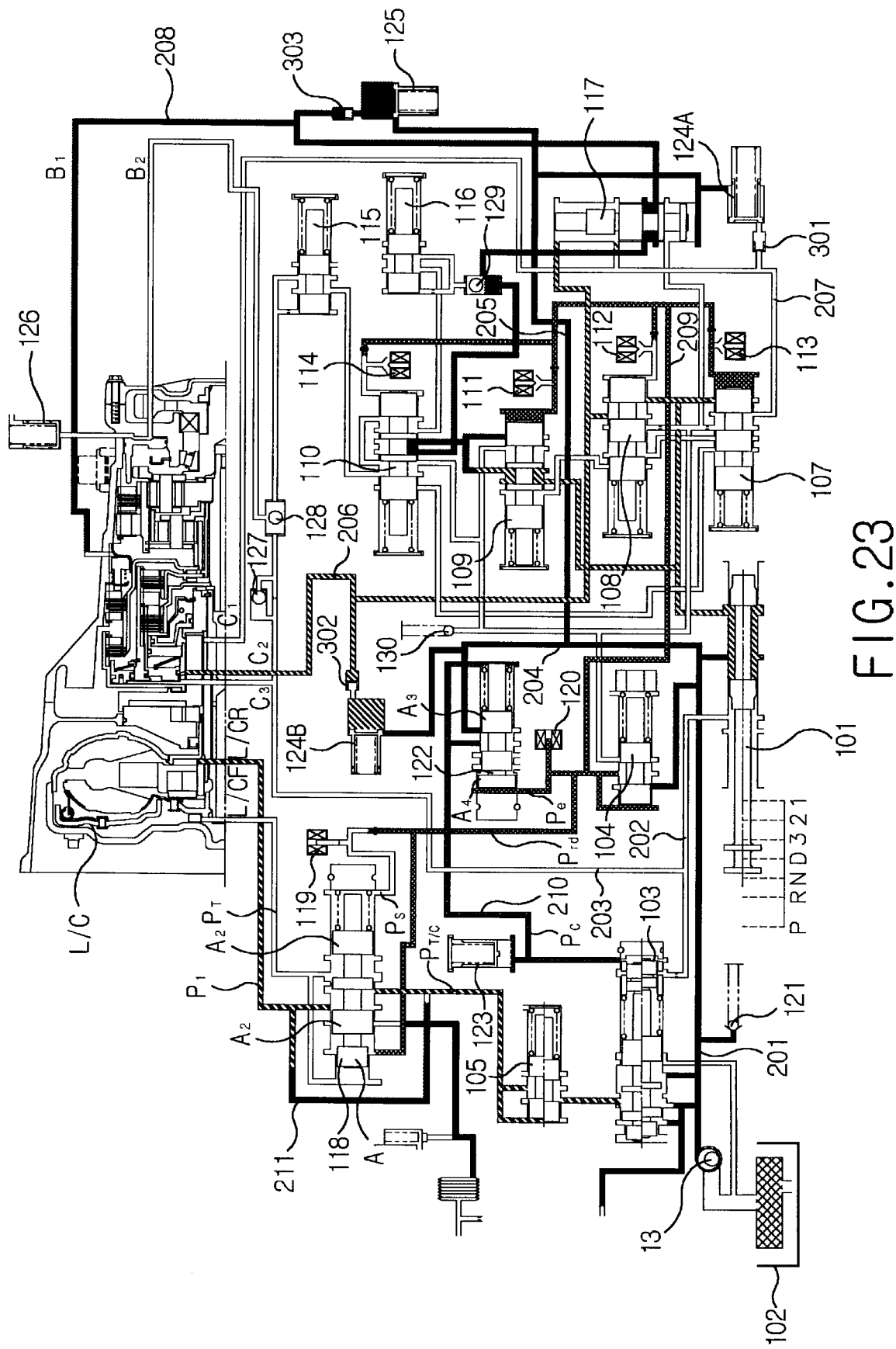
FIG. 23 is a diagram showing the states of the elements of a hydraulic control system of an automatic variable transmission embodying the invention when the transmission is operating in a partial lock-up state in a fourth forward gear.

To shift from third gear to fourth gear when the transmission selector is set in the Drive "D" state, it is necessary to disengage the first clutch C1 and to engage the first brake B1. As shown in FIG. 22, the first solenoid valve 111 and the third solenoid valve 113 are turned 'on' by the electromagnetic control unit. This causes pressurized hydraulic fluid to be applied to the right side end of the direction shifting valve 109 and first clutch valve 107, respectively. Accordingly, a spool of the direction shifting valve 109 and first clutch valve 107, is urged to the left side and the passageway is thus shifted. The application of hydraulic fluid pressure to the first clutch control valve 107 cuts off the supply of hydraulic fluid pressure to the first clutch C1, which disengages. The application of hydraulic fluid pressure to the first brake control valve 109, causes hydraulic fluid to be applied to the first brake B1 through the safety valve 117. Because the second solenoid valve remains 'on', the hydraulic fluid passing through the first clutch valve 107 passes through the second clutch valve 108, such that the supply of hydraulic fluid pressure to the second clutch C2 is maintained.

Lock-up in the Fourth Gear

In this state, the lock-up controlling solenoid valve 119 closes the passageway leading to the right side end of the lock-up control valve 118. Accordingly, the lock-up control valve 118 is urged to right side by a pressure difference. The passageway communicating with a lock-up releasing chamber of the torque converter from the relief valve 105 is cut, and the passageway communicating with the lock-up chamber is opened. Accordingly, the lock-up clutch is locked in an engaged position. In this case, the engine is directly connected with the output shaft.

On the other hand, when a speed of vehicle is decreased from a lock-up 'on' state to a lock-up 'off' state, the solenoid valve 119 at least partially opens the passageway leading to the right side end of the lock-up control valve 118, and the hydraulic fluid pressure pushes the valve to left side, thereby opening a passageway to the lock-up releasing chamber. Accordingly, the lock-up clutch is at least partially disengaged, and power transfer is made by means of the torque converter.

As described above, since an automatic variable transmission embodying the present invention uses less parts relative to a conventional automatic variable transmission having four forward gears, the transmission can be made more compact and less expensive.

In addition, the hydraulic pressure control device of an automatic variable transmission embodying the present invention utilizes existing solenoid valves, so that the structure is simple, and complicated electronic control logic and the like is not necessary. Thus manufacturing costs are further decreased.

Furthermore, the present invention is a structure which matches shifting of the transmission elements under the time control of the solenoid valves. Thus, the necessary transmission can be exactly obtained and an exact lock-up force can also be obtained.

The preferred embodiments for an automatic variable transmission and hydraulic pressure control system thereof that embody the present invention are shown and described above. It is understood, however, that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A vehicle transmission, comprising:

a housing;

an input shaft mounted in the housing for supplying power an output shaft for outputting power;

first and second planetary gearsets disposed within the housing between the input shaft and the output shaft, the first and second planetary gearsets each having a sun gear, a planetary pinion gear carrier, and a ring gear;

a first clutch for selectively connecting and disconnecting the input shaft to the sun gear of the second planetary gearset;

a second clutch for selectively connecting and disconnecting the input shaft to the planetary pinion gear carrier of the first planetary gearset;

a third clutch for selectively connecting and disconnecting the input shaft to the sun gear of the first planetary gearset;

a first brake for selectively braking the sun gear of the first planetary gearset;

a second brake for selectively braking the ring gear of the second planetary gearset and the planetary pinion gear carrier of the first planetary gearset; and a one-way clutch which allows the ring gear of the second planetary gearset to rotate in only one direction, wherein the first clutch, the second clutch, the first planetary gearset and the second planetary gearset are arranged, in that order, along a common axis.

2. The transmission of claim 1, wherein the output shaft is connected to a planetary pinion gear carrier of the second planetary gearset.

3. The transmission of claim 2, wherein a ring gear of the first planetary gearset is connected to and rotates with the planetary pinion gear carrier of the second planetary gearset.

4. The transmission of claim 3, wherein the planetary pinion gear carrier of the first planetary gearset is connected to and rotates with the ring gear of the second planetary gearset.

5. The transmission of claim 1, wherein the planetary pinion gear carrier of the first planetary gearset is connected to and rotates with a ring gear of the second planetary gearset, and wherein a ring gear of the first planetary gearset is connected to and rotates with a planetary pinion gear carrier of the second planetary gearset.

6. The transmission of claim 1, wherein the one way clutch also ensures that the planetary pinion gear carrier of the first planetary gearset can rotate in only a single direction.

7. A vehicle transmission, comprising:

a housing;

an input shaft mounted on the housing;

an output shaft mounted on the housing;

a first planetary gearset having a sun gear, a planetary pinion gear carrier, and a ring gear;

a second planetary gearset having a sun gear, a planetary pinion gear carrier and a ring gear;

a first clutch configured to selectively lock the input shaft of the sun gear of the second planetary gearset to the input shaft; and a second clutch configured to selectively lock the planetary pinion gear carrier of the first planetary gearset to the input shaft, wherein the first clutch, the second clutch, the first planetary gearset and the second planetary gearset are arranged, in that order, along a common axis of the transmission.

8. The transmission of claim 7, wherein the ring gear of the first planetary gearset is connected to and rotates with the planetary pinion gear carrier of the second planetary gearset.

9. The transmission of claim 8, wherein the planetary pinion gear carrier of the first planetary gearset is connected to and rotates with the ring gear of the second planetary gearset.

10. The transmission of claim 7, wherein the planetary pinion gear carrier of the first planetary gearset is connected to and rotates with the ring gear of the second planetary gearset.

11. The transmission of claim 7, further comprising a one way clutch which allows the ring gear of the second planetary gearset to rotate in only a single direction.

12. The transmission of claim 11, wherein the one way clutch also ensures that the planetary pinion gear carrier of the first planetary gearset only rotates in a single direction.

13. The transmission of claim 7, further comprising a third clutch that selectively locks the sun gear of the first planetary gearset to the input shaft.

14. The transmission of claim 7, further comprising a first brake that selectively locks the sun gear of the first planetary gearset to the housing.

15. The transmission of claim 14, further comprising a second brake that selectively locks the ring gear of the second planetary gearset to the housing.

16. The transmission of claim 15, wherein the second brake also selectively locks the planetary pinion gear carrier of the first planetary gearset to the housing.

* * * * *